US012185434B2

(12) United States Patent
Zorzetto et al.

(10) Patent No.: US 12,185,434 B2
(45) Date of Patent: Dec. 31, 2024

(54) SEMI-FINISHED PRODUCT OF AN ELECTRIC HEATER DEVICE

(71) Applicant: ELTEK S.p.A., Casale Monferrato (IT)

(72) Inventors: Mauro Zorzetto, Casale Monferrato (IT); Marco Bizzarro, Casale Monferrato (IT); Alberto Barbano, Casale Monferrato (IT); Luca Vercellotti, Casale Monferrato (IT); Luca Costa, Casale Monferrato (IT); Marco Pizzi, Casale Monferrato (IT)

(73) Assignee: ELTEK S.p.A., Casale Monferrato (IT)

( * ) Notice: Subject to any disclaimer, the term of this patent is extended or adjusted under 35 U.S.C. 154(b) by 960 days.

(21) Appl. No.: 17/277,096

(22) PCT Filed: Sep. 6, 2019

(86) PCT No.: PCT/IB2019/057516

§ 371 (c)(1),
(2) Date: Mar. 17, 2021

(87) PCT Pub. No.: WO2020/058797

PCT Pub. Date: Mar. 26, 2020

(65) Prior Publication Data

US 2021/0385911 A1 Dec. 9, 2021

(30) Foreign Application Priority Data

Sep. 18, 2018 (IT) ........................ 102018000008700

(51) Int. Cl.
*H05B 3/34* (2006.01)

(52) U.S. Cl.
CPC .......... *H05B 3/34* (2013.01); *H05B 2203/011* (2013.01); *H05B 2203/02* (2013.01)

(58) Field of Classification Search
CPC ............... H05B 3/34; H05B 2203/011; H05B 2203/02; H05B 3/56; H05B 3/12; H05B 3/145; H05B 3/146; H05B 1/0291
(Continued)

(56) References Cited

U.S. PATENT DOCUMENTS 4,314,231 A * 2/1982 Walty ..................... H01C 7/027 338/334
5,955,936 A * 9/1999 Shaw, Jr. ............. H01C 1/1406 338/328

(Continued)

FOREIGN PATENT DOCUMENTS

CN 1571586 A 1/2005
CN 101072459 A 11/2007

(Continued)

OTHER PUBLICATIONS

International Search Report for PCT/IB2019/057516, mailed Dec. 2, 2019, 4 pages.

(Continued)

*Primary Examiner* — Phuong T Nguyen
(74) *Attorney, Agent, or Firm* — Nixon & Vanderhye P.C.

(57) ABSTRACT

A semifinished product of an electric heater device (1) has a structure that extends in a length direction (L) and that comprises: —two connection bodies (2), which substantially extend alongside one another or parallel to one another in the length direction (L) and are at least in part flexible or deformable in the length direction (L); and —a plurality of heating bodies (3), each heating body (3) including a material having a PTC effect. The heating bodies (3) are set at a distance from one another in the length direction (L) and generally extend in a direction transverse to the length direction (L). The material having a PTC effect is a polymer-based material that is in electrical contact with the at least two connection bodies (2). Each of the at least two connec-
(Continued)

tion bodies (2) comprises electrical- and mechanical-connection parts (2*a*), which have a mesh structure that is at least partially embedded or englobed in the polymer-based material.

17 Claims, 27 Drawing Sheets

(58) Field of Classification Search
USPC ....... 219/539, 540, 541, 544, 548, 549, 552, 219/553
See application file for complete search history.

(56) References Cited

U.S. PATENT DOCUMENTS

| | | | | |
|---|---|---|---|---|
| 7,049,559 | B2 | 5/2006 | Ishii et al. | |
| 7,876,194 | B2 * | 1/2011 | Ihle | H05B 3/34 338/53 |
| 2004/0173594 | A1 | 9/2004 | Weiss et al. | |
| 2007/0257027 | A1 | 11/2007 | Krobok | |
| 2009/0179731 | A1 | 7/2009 | Ihle et al. | |
| 2018/0152990 | A1 | 5/2018 | Klinkmüller et al. | |

FOREIGN PATENT DOCUMENTS

| | | | |
|---|---|---|---|
| CN | 107771411 | A | 3/2018 |
| JP | H04-280089 | A | 10/1992 |
| JP | 2009-544123 | A | 12/2009 |
| WO | 2018203207 | | 11/2018 |

OTHER PUBLICATIONS

Written Opinion of the ISA for PCT/IB2019/057516, mailed Dec. 2, 2019, 7 pages.

* cited by examiner

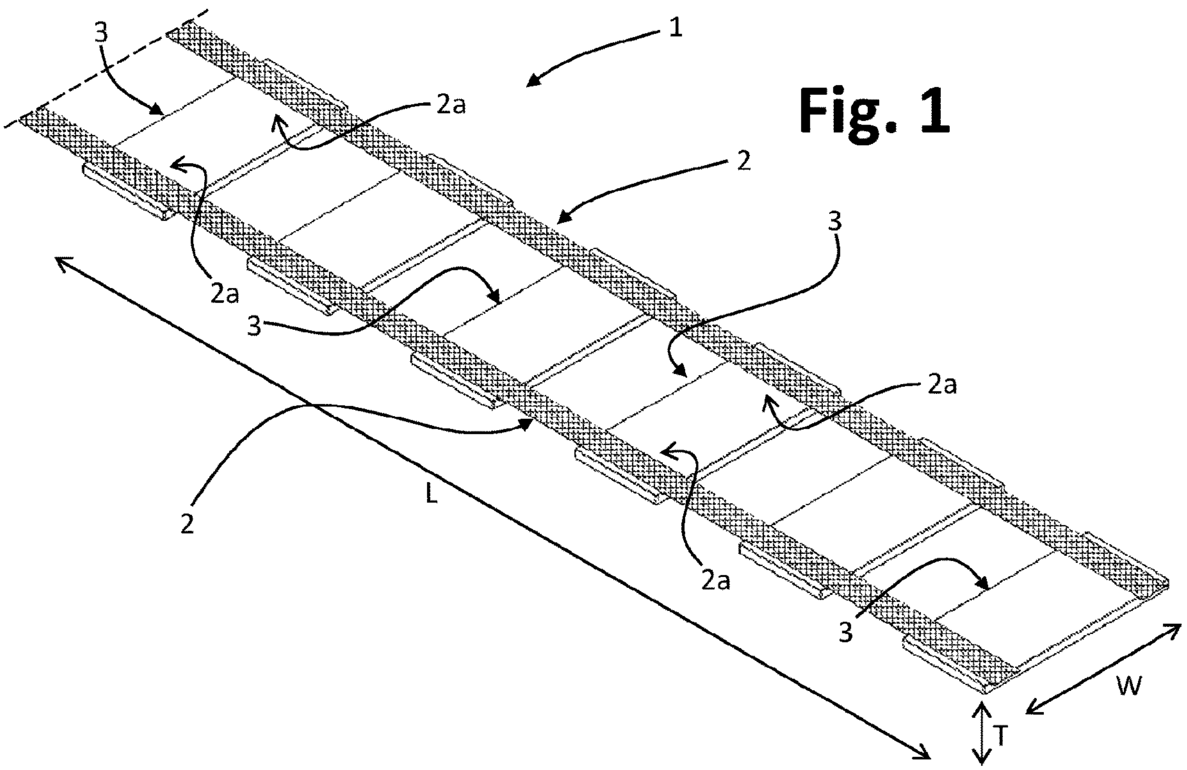
Fig. 1
Fig. 2
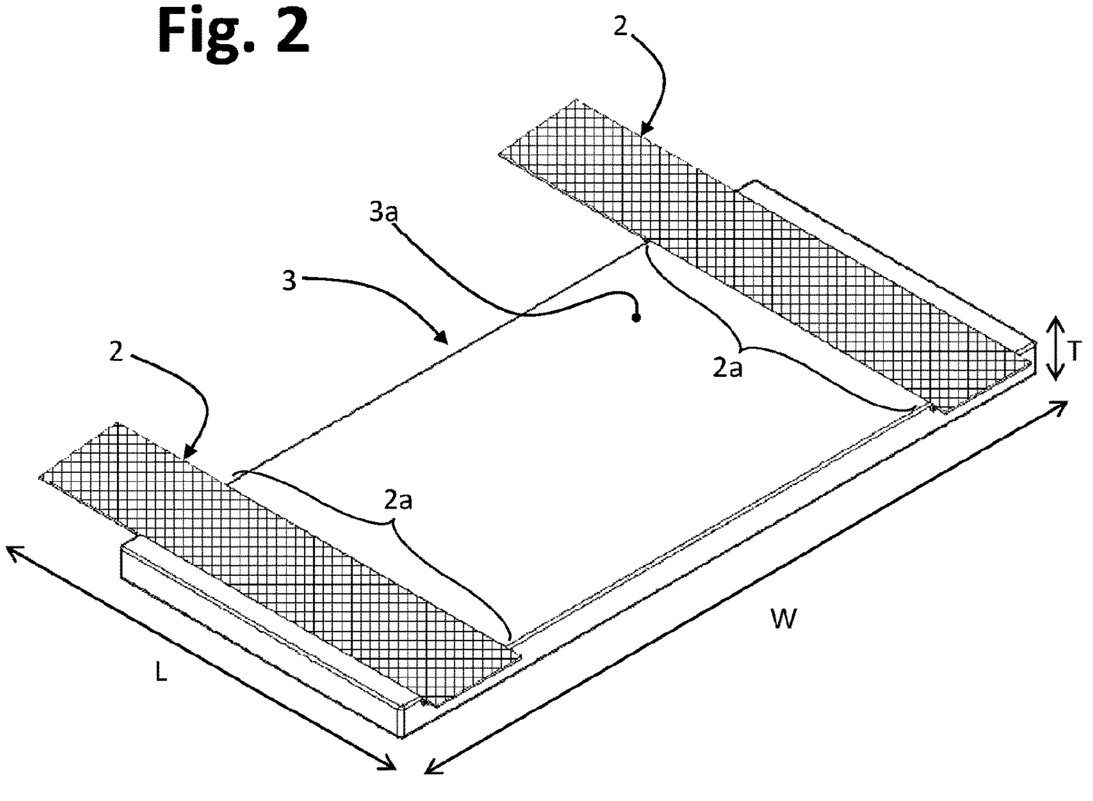

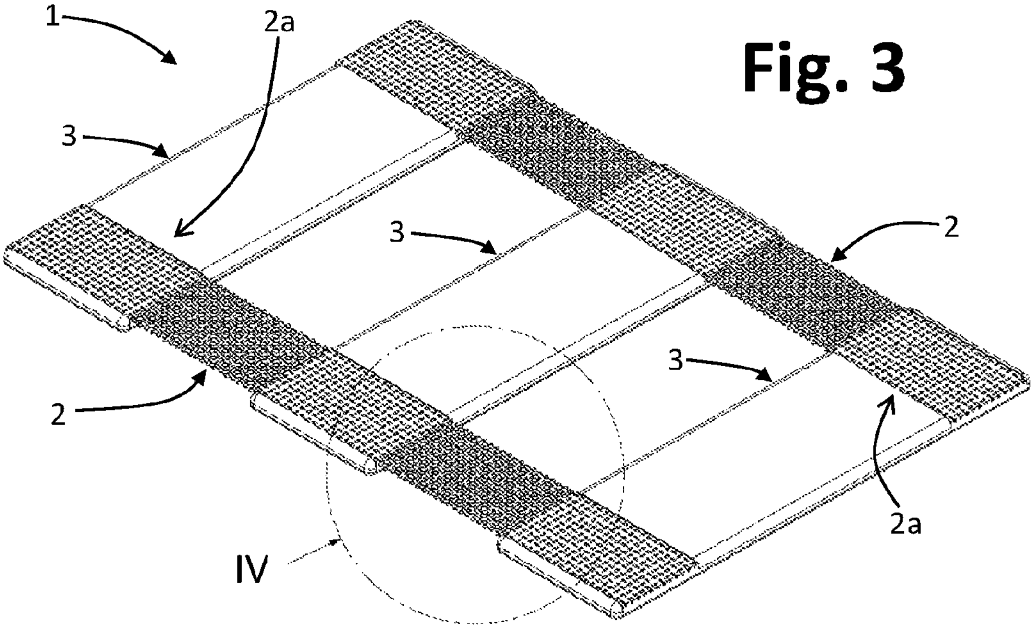
Fig. 3
Fig. 4
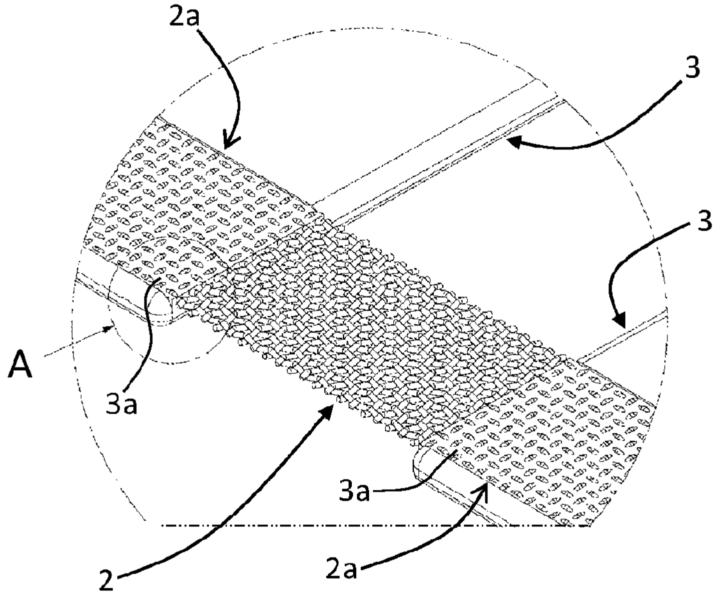

Fig. 9
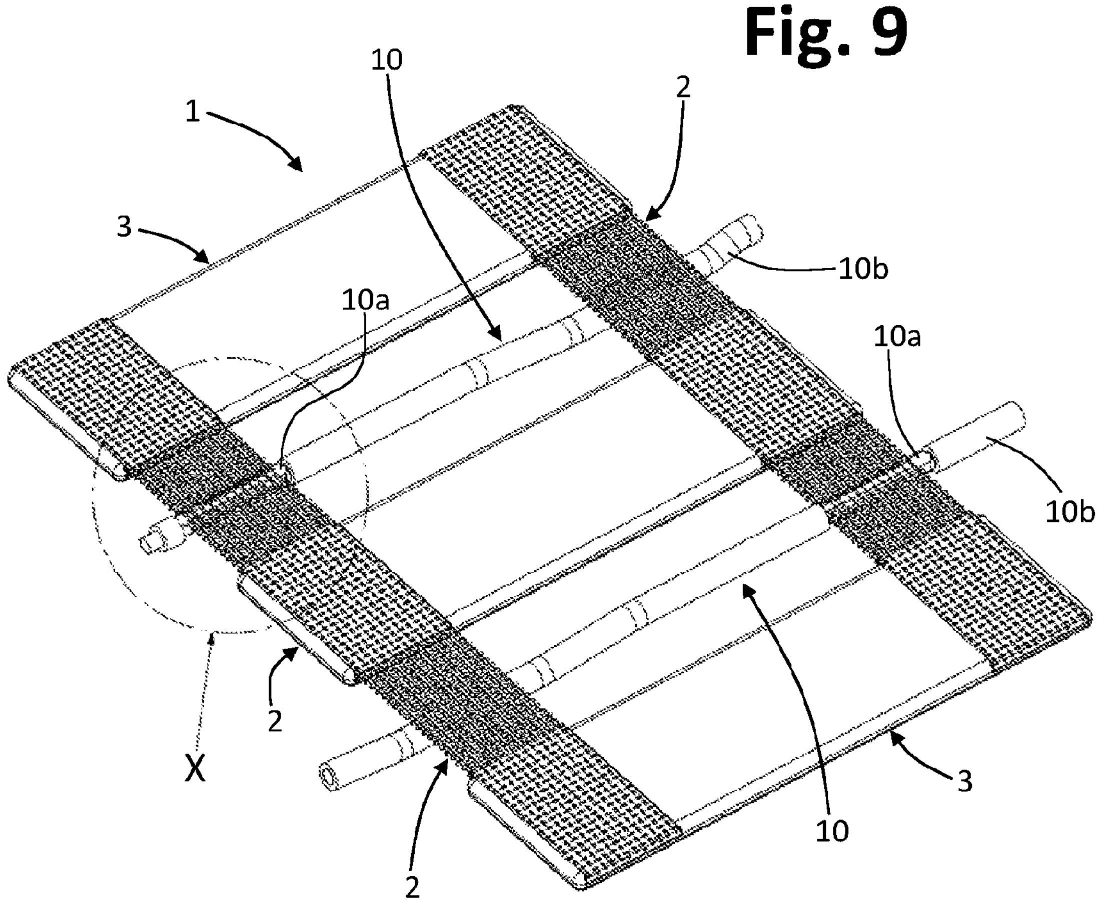
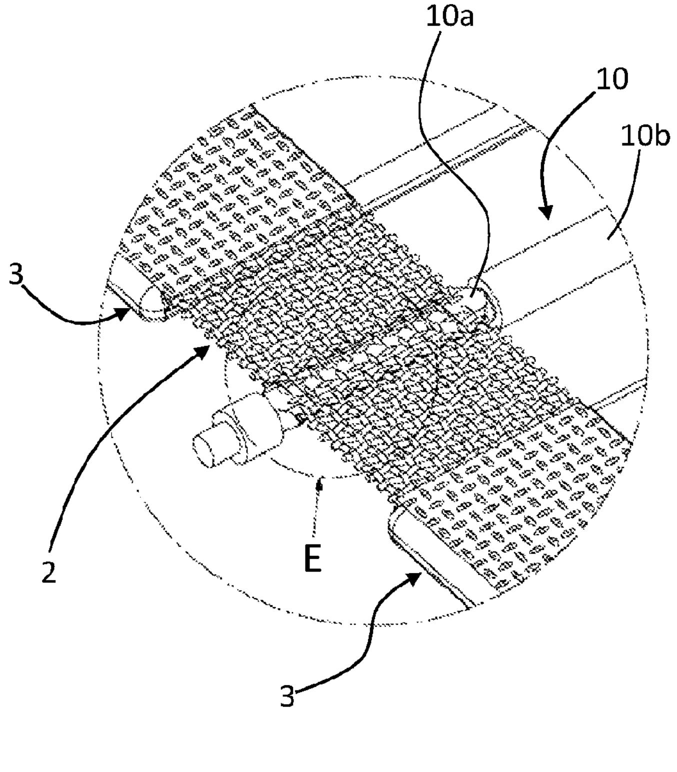
Fig. 10

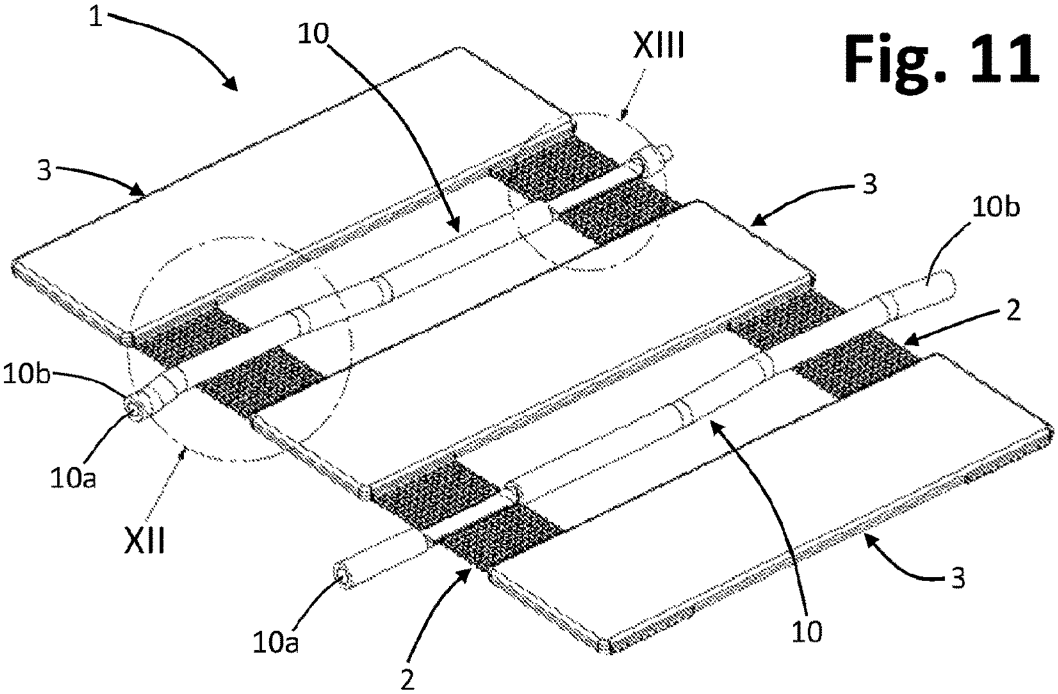
Fig. 11
Fig. 12
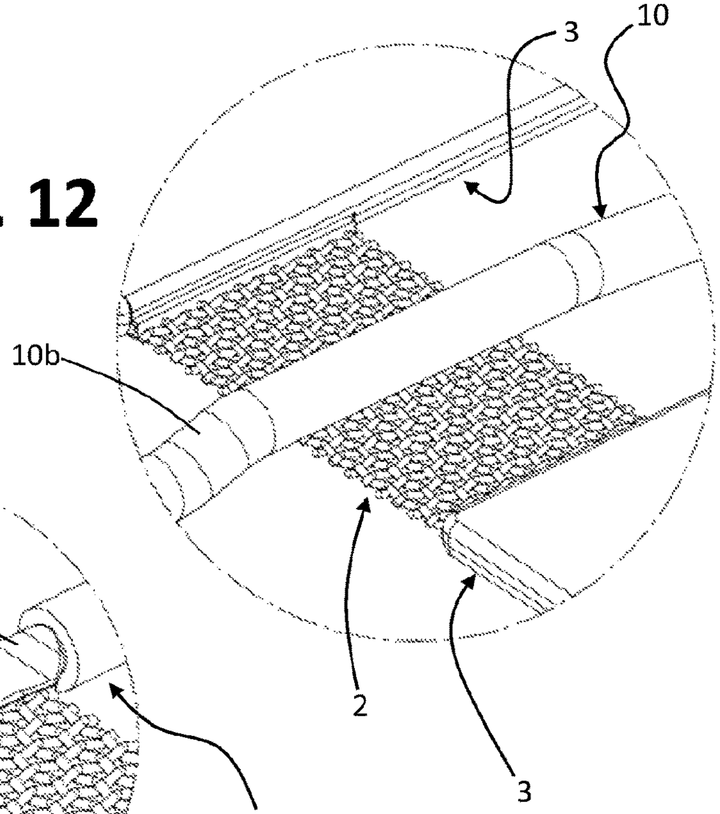
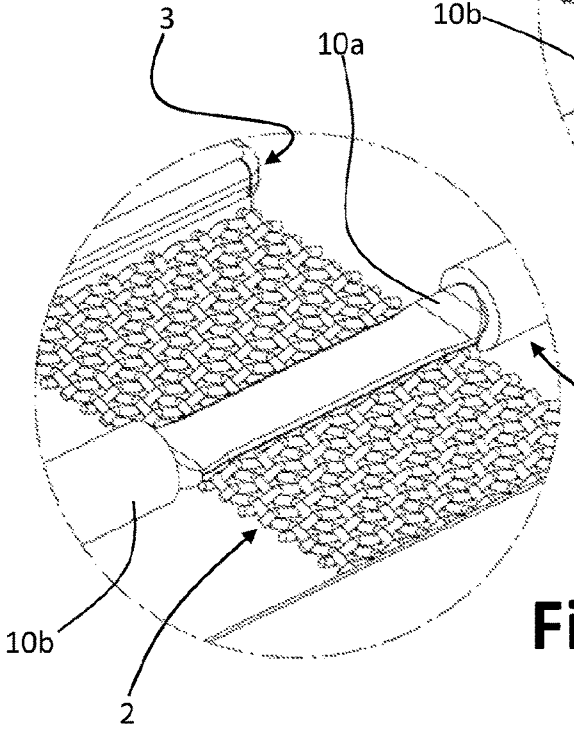
Fig. 13

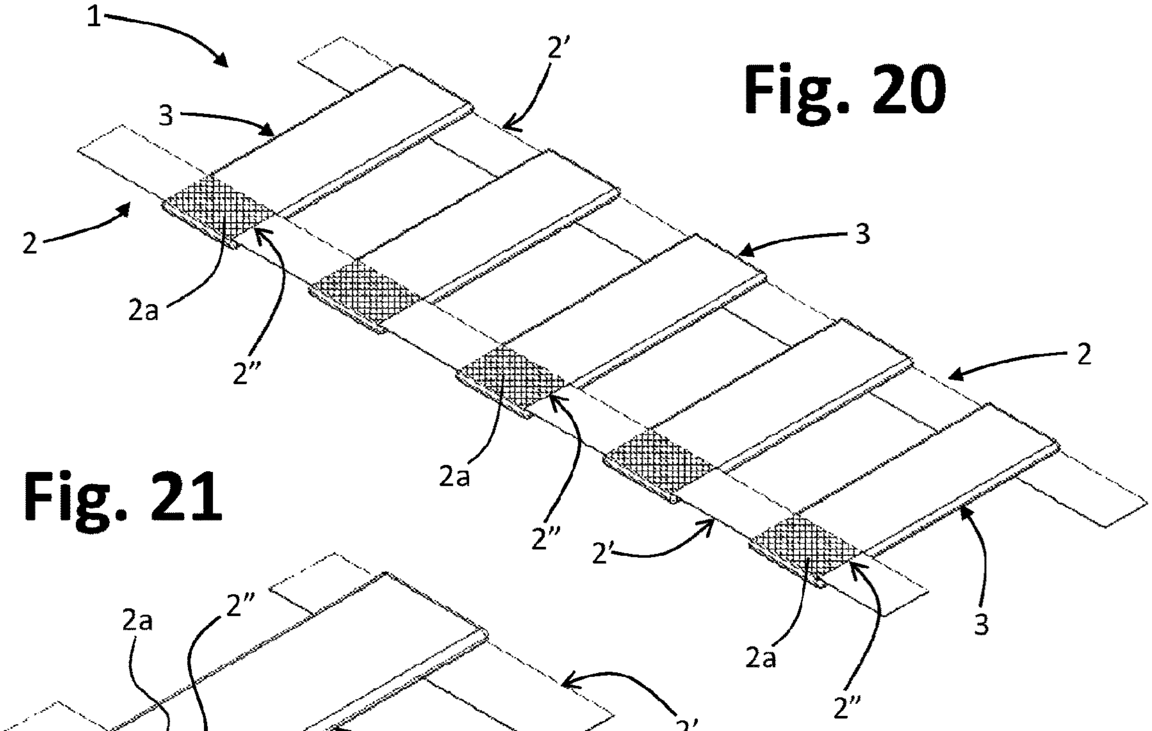
Fig. 20
Fig. 21
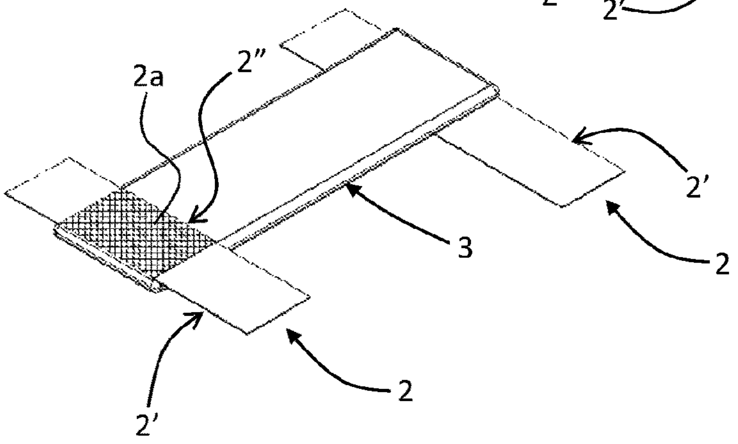
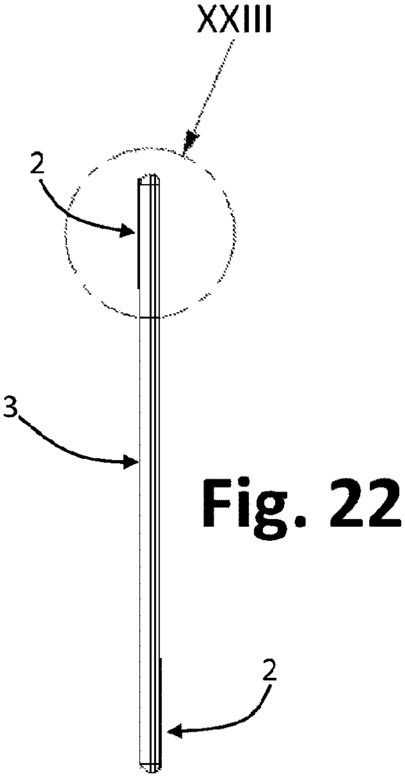
Fig. 22
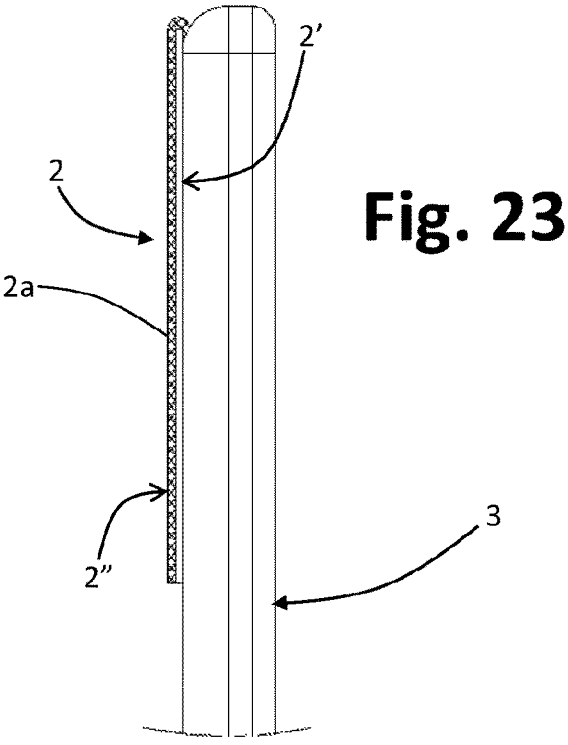
Fig. 23

Fig. 24
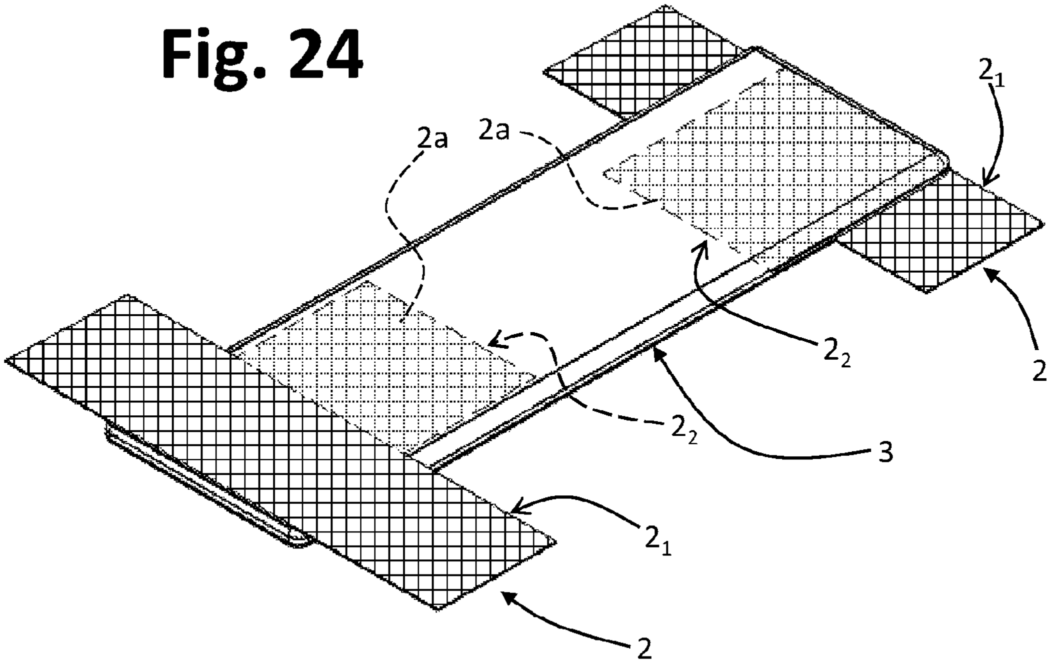
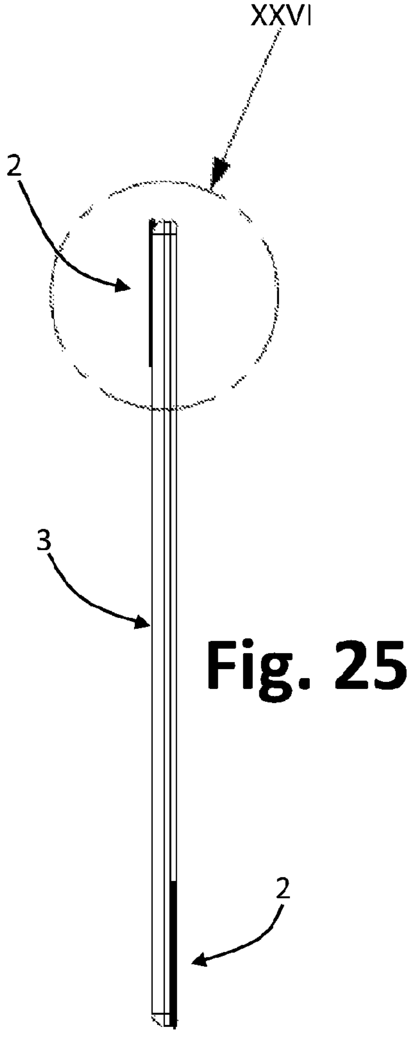
Fig. 25
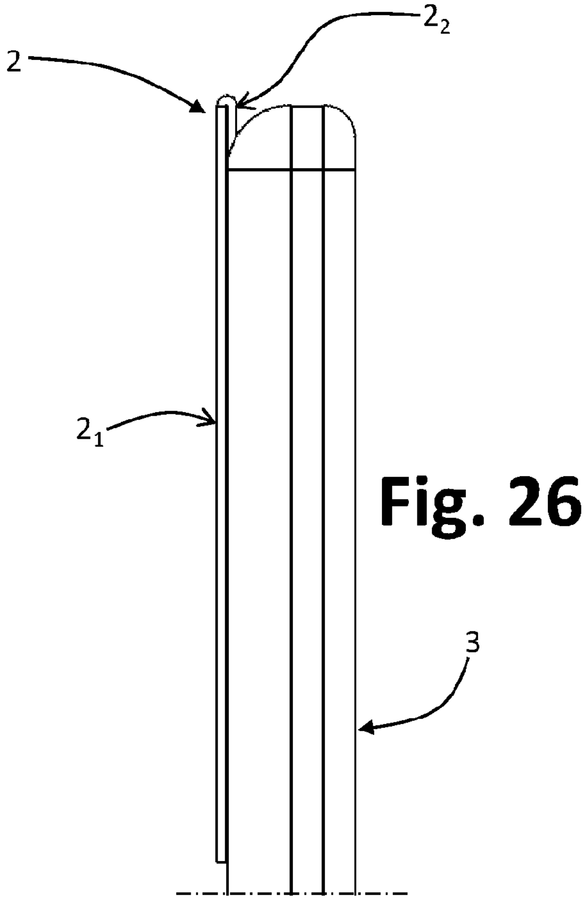
Fig. 26

SEMI-FINISHED PRODUCT OF AN ELECTRIC HEATER DEVICE

This application is the U.S. national phase of International Application No. PCT/IB2019/057516 filed 6 Sep. 2019, which designated the U.S. and claims priority to IT patent application Ser. No. 10/201,8000008700 filed 18 Sep. 2018, the entire contents of each of which are hereby incorporated by reference.

FIELD OF THE INVENTION

The present invention relates to electric heater devices and to the corresponding methodologies of production, and more in particular to devices based upon the use of polymer-based materials, i.e., materials comprising at least one polymer, distinguished by an electrical resistance with positive temperature coefficient, i.e., ones having a PTC effect.

The invention has been developed with particular reference to the production of electric heater devices that are to be associated to, or integrated in, vehicles components, such as heaters for tanks, heaters for filters, heaters for fluid ducts, heaters for batteries, heaters for substances that are subject to freezing or that vary their characteristics as a function of temperature, or again heaters used for heating aeriforms, such as air of environments or air subject to forced circulation on the surface of the aforesaid heaters.

The invention finds preferred application in the sector of components of tanks or ducts that are to come into contact with a liquid, for example a liquid used in a vehicle, such as liquids necessary for operation of internal-combustion engines or operation of systems for treatment or reduction of exhaust gases of internal-combustion engines, including water-injection or anti-detonant-injection systems.

The semifinished product and the heater devices according to the invention may in any case also be applied in contexts different from the preferential ones referred to above.

PRIOR ART

Production of electric heater devices that use a plurality of heating bodies made of a material having a PTC effect is widespread, given the functional characteristics of these materials. In some cases, the heater device includes a single heating body made of material having a PTC effect with opposite surfaces having a relatively wide area, associated to which are two electrodes of accordingly large dimensions, constituted by metal plates. In other cases, the heater device includes, instead, a plurality of heating bodies of relatively small dimensions, with respective electrodes connected to electrical-connection bodies. Alongside the more traditional ceramic-based materials there have in recent times appeared PTC-effect polymeric materials, which can be obtained more easily in various shapes and can be moulded directly between corresponding electrodes. Notwithstanding this, the production of heater devices that integrate a number of heating bodies made of PTC-effect polymeric material is still generally complicated, and the same may be said as regards integration of the aforesaid heater devices in more complex functional components.

For instance, a typical problem in the sector of motor-vehicle components is represented by the variability of the conformation of the tanks, typically shaped in a different way according to the type of vehicle so as to be able to exploit as far as possible the volumes available. Consequently, in this sector, PTC-effect heater devices are typically provided that are substantially rigid and specifically shaped to adapt to the corresponding tank.

For instance, WO2017077447 A describes a heater device designed for integration in a component of a vehicle tank, in particular a component having a generally cylindrical shape. The device comprises a plurality of heating bodies made of a PTC-effect polymeric material, each of which is set between a first electrode and a second electrode, with the first and second electrodes associated to the various heating bodies that are connected to a first electrical-connection body and a second electrical-connection body, respectively. The PTC-effect polymeric material that is necessary for formation of each heating body is overmoulded between facing surfaces of the first and second electrodes, and then an electrically insulating plastic material is overmoulded on the electrodes, with the corresponding heating bodies set in between, and on the connection bodies.

The first electrodes with their corresponding connection body, on one side, and the second electrodes with their corresponding connection body, on the other side, can be defined in a single piece, via operations of blanking starting from respective plane metal plates. The two blanked plane pieces are set in parallel positions in a mould, via which the PCT-effect polymeric material is moulded only between the facing surfaces of the electrodes defined by each plane piece. In this way, a substantially plane semifinished product is obtained, which is then subjected to bending operations, in areas of junction between the electrodes and the corresponding connection bodies, in such a way that the semifinished product itself will assume an approximately cylindrical configuration. The plastic material that forms the casing body, here corresponding to the body of the tank component, is then overmoulded on the semifinished product.

A further typical problem of known heaters of the aforesaid type is constituted by detachment of the PTC-effect polymeric material from the corresponding metal electrodes, with consequent operating faults, where the aforesaid drawback may be a consequence of the different degrees of expansion and contraction of the different materials, such as a polymer and a metal, during the cycles of heating and subsequent cooling, in particular during operation and/or as a result of environmental conditions. This drawback may be more easily noted in heaters of large dimensions, such as heaters for vehicle tanks, where consequently the phenomena of expansion of the materials are accentuated, in particular in the directions of width and length of the heater device (this on account of the fact that in this case the expansions "add" together, for example causing dimensional variations that are very accentuated in the peripheral areas or in the end areas opposite to the areas of fixing or mechanical constraint of the device).

A further related problem is represented by the mechanical stresses that are set up between the heating bodies and the corresponding casing, in particular in the presence of different expansions or dimensional variations due to cycles of heating and subsequent cooling.

As may be noted, the modalities of production of the heater device and/or its integration in a different component are relatively laborious and can give rise to malfunctioning. It will moreover be appreciated that, since the device is designed for integration in components that have a specific geometry, it is necessary to produce and store various versions of the device, for the purposes of their integration on other components that present different geometries.

AIM AND SUMMARY OF THE INVENTION

In view of what has been set forth above, the present invention has basically the aim of simplifying production of electric heater devices that use PTC-effect polymeric materials, and/or integration thereof in more complex components, such as tanks and/or devices for tanks, in particular for vehicles.

The above and other aims still, which will emerge clearly hereinafter, are achieved according to the present invention by a semifinished product of an electric heater device, a corresponding production method, and an electric heater device that present the characteristics specified in the annexed claims. The claims form an integral part of the technical teaching provided herein in relation to the invention.

In brief, the invention relates to a semifinished product of a heater device, the structure of which basically comprises at least two connection bodies that extend substantially parallel to one another in a length direction and that are flexible or easily deformable at least in the aforesaid direction, and a plurality of heating bodies that include at least one polymeric material having a PTC effect.

Preferentially, the heating bodies are substantially rigid, or have in any case a lower flexibility or capacity of deformation as compared to the connection bodies. The heating bodies are set at a distance from one another in the length direction and generally extend in a direction transverse thereto.

Preferably, the connection bodies provide areas of articulation or of at least partial bending or deformation between the heating bodies, for example to be able to vary the angular arrangement between the heating bodies themselves, in particular during steps of production of electric heater devices or other components that include at least one semifinished product according to the invention, or to be able to vary the distance between the heating bodies, in particular in the presence of expansions and contractions during temperature variations.

The parts of the connection bodies that extend between two heating bodies can also provide compensation areas, useful for preventing mechanical stresses, with consequent risk of detachment, between the connection bodies and the heating bodies, thereby reducing the risk of decrease in electrical contact or increase in electrical resistance between the heating bodies and the connection bodies. Preferably, the aforesaid compensation areas of the connection bodies that extend between the heating bodies also make it possible to avoid mechanical stresses between the heating elements and the corresponding casing, potentially caused by different degrees of expansion or different dimensional variations due to thermal cycles.

The material having a PTC effect is a polymer-based material that is in electrical contact with the at least two connection bodies, preferably in two opposite end regions of the corresponding heating body, with the at least two connection bodies which each comprise a longitudinal element, that extends in the length direction of the semifinished product and has a width appreciably smaller than the width of the heating bodies. Each of the two connection bodies comprises electrical- and mechanical-connection parts, which have a mesh structure that is at least partially embedded or englobed in the polymer-based material of a respective heating body.

Thanks to the characteristics referred to, the semifinished product can possibly be produced so as to present a large length, even in the region of several metres, and conveniently rolled up or folded on itself for storage purposes. When necessary, the semifinished product can be unrolled and sections or lengths of the desired size can be cut therefrom, according to the requirements of production of heater devices or components that integrate them. This operation is eased by the reduced width of the connection bodies at least in their intermediate parts, i.e., the parts thereof which extends between two successive heating bodies. The intrinsic flexibility or deformability of the semifinished product, also eased by the reduced width of the connection bodies in the intermediate parts thereof that extend between two successive heating bodies, enables its convenient integration and/or its adaptation in a plurality of different types of heater devices and components in general, which may even have geometrical shapes that are very different from one another, such as integration and/or adaptation to the shapes of different tanks for vehicles.

Production of the heating bodies using a PTC-effect polymeric material simplifies production of the semifinished product in so far as such bodies can be formed via simple operations of injection moulding.

Use of mesh structures at least partially embedded in the PTC-effect material, for electrical and mechanical connection of the heating bodies, ensures a reliable electrical and mechanical connection, at the same time countering risks of separation or detachment between the parts in question and/or from a casing of the device, in particular when the semifinished product is being manipulated, for example rolled up or folded on itself and then unrolled or subjected to deformation in the production stage. The mesh structure, distinguished by solids and voids, also eases the bending or deformation capability of the semifinished product, as well as cutting thereof into sections or lengths, when the mesh structure of the connection bodies is also used for connecting the heating bodies to one another.

BRIEF DESCRIPTION OF THE DRAWINGS

Further aims, characteristics, and advantages of the present invention will emerge clearly from the ensuing detailed description, with reference to the annexed drawings, which are provided purely by way of non-limiting example and in which:

FIG. 1 is a perspective, partial, and schematic view of a semifinished product of an electric heater device according to possible embodiments of the invention;

FIG. 2 illustrates a detail of FIG. 1;

FIG. 3 is a perspective, partial, and schematic view of a semifinished product of an electric heater device according to possible embodiments of the invention, obtained with a first production technique;

FIG. 4 illustrates the detail IV of FIG. 3;

FIG. 9 is a perspective, partial, and schematic view aimed at illustrating a possible modality of electrical connection of a semifinished product according to possible embodiments of the invention;

FIG. 10 illustrates the detail X of FIG. 9;

FIG. 11 is a view similar to that of FIG. 9, corresponding to the opposite side of the semifinished product;

FIGS. 12 and 13 illustrate the details XIII and XIII of FIG. 11;

FIGS. 20, 21, and 22 are views similar to those of FIGS. 16, 17, and 18, respectively, of a semifinished product of an electric heater device according to further possible embodiments of the invention;

FIG. 23 illustrates the detail XXIII of FIG. 22;

FIGS. 24 and 25 are views similar to those of FIGS. 17 and 18, respectively, regarding a semifinished product of an electric heater device according to further possible embodiments of the invention;

FIG. 26 illustrates the detail XXVI of FIG. 25;

DESCRIPTION OF PREFERRED EMBODIMENTS OF THE INVENTION

Figure 5:
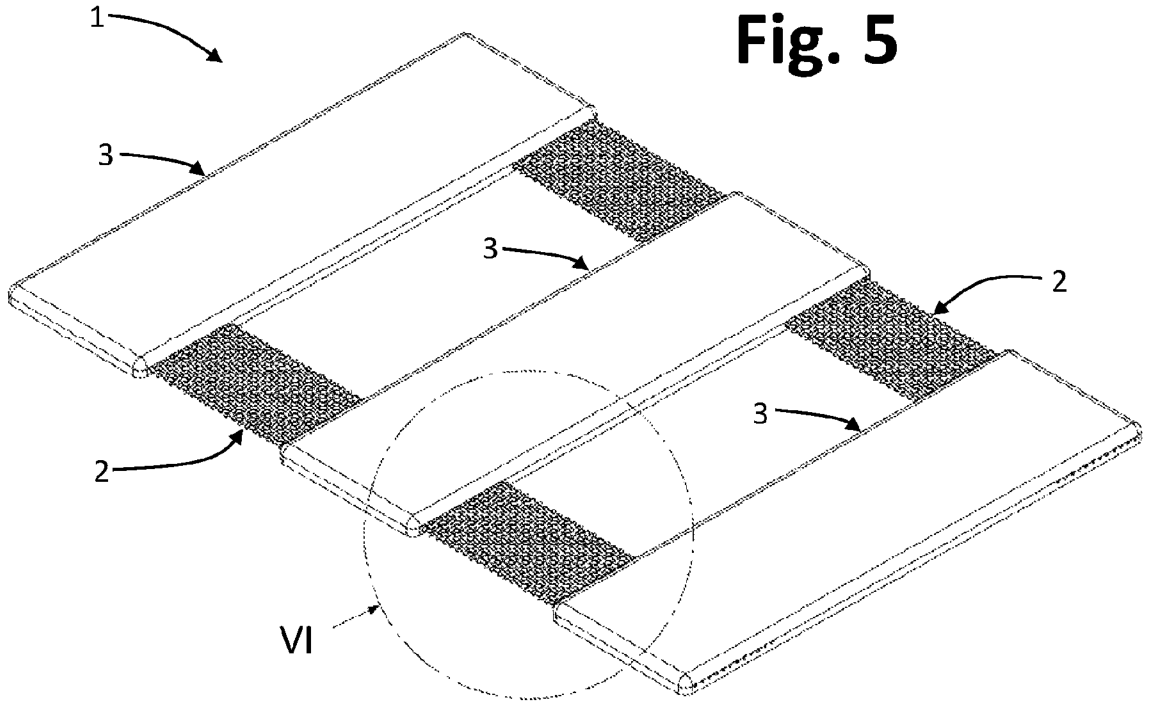
FIG. 5 is a perspective, partial, and schematic view of a semifinished product of an electric heater device according to possible embodiments of the invention, obtained with a second production technique.

Reference to "an embodiment", "one embodiment", or "various embodiments" and the like, in the framework of the present description is intended to indicate that at least one detail, configuration, structure, or characteristic described in relation to the embodiment is comprised in at least one embodiment. Hence, phrases such as "in an embodiment", "in one embodiment", "in various embodiments", and the like, that may be present in various points of the present description do not necessarily refer to one and the same embodiment. Moreover, particular conformations, structures, or characteristics defined in this description may be combined in any adequate way in one or more embodiments, even different from the ones represented. The reference numbers and spatial references (such as "upper", "lower", "top", "bottom", etc.) used herein are provided merely for convenience and hence do not define the sphere of protection or the scope of the embodiments.

In the present description and in the attached claims, the generic term "material" is to be understood as including also mixtures, compositions, or combinations of a number of different materials (for example, multilayer structures or composite materials).

In the present description and in the attached claims, the term "mesh structure" is intended to indicate a structure distinguished by an alternation of solids and voids, for example like a net, a sieve, a woven fabric, a braid, etc; the aforesaid structure may be formed by the criss-crossing or interweaving of a plurality of substantially filiform elements, such as threads or wires, or else obtained by processing of a single starting element, for example a metal strap that is blanked and/or shaped and/or stretched for bestowing thereon a meshed shape.

In the present description and in the attached claims, the term "semifinished product" is intended to designate an intermediate product or component, which is to undergo further processing and/or can be used in the production of more complex products or articles, even of types very different from one another. In this perspective, for example, a length of a semifinished product according to the invention can be completed with a casing and suitable control means and/or means for connection to an electric power source in order to produce a heater device, or else can be integrated in a different component that may also perform functions other than heating, such as a component of a tank of a vehicle. Even when a length of a semifinished product according to the invention, without any casing, is simply mounted on a different structure (for example, a duct or a tank), it in any case constitutes an intermediate component, which must be further equipped, for example, with means for fixing in position, means for connection to an electric power source, and possible control means.

Represented schematically in FIG. 1 is a portion or piece of a semifinished product of an electric heater device according to possible embodiments of the invention. The semifinished product, designated as a whole by 1, has a structure that extends in a direction of length L and a direction of width W and has a thickness T. The structure 1 is relatively stiff in the width direction W and substantially flexible or deformable in the length direction L. In any case, the structure 1 is more flexible, or more easily deformable, in the direction L than in direction W.

In various embodiments, the structure 1 can be rolled up or folded on itself. In other words, the structure 1 is sufficiently flexible or deformable in its length direction to enable it to be wound on itself to assume a more or less cylindrical shape, in particular to form a roll or the like, or else be folded on itself in opposite directions (i.e., in a zigzag pattern), to form a sort of more or less parallelepipedal stack.

Hence, assume that FIG. 1 represents a piece or length of semifinished product of limited size.

The rollable or foldable structure of the semifinished product 1 comprises at least two electrical- and mechanical-connection bodies 2, which include two longitudinal elements made of electrically conductive material, which extend alongside one another in the direction L, preferably substantially parallel to one another, and which—as has been mentioned—are flexible or deformable at least in the aforesaid direction L. The structure of the semifinished product 1 further comprises a plurality of heating bodies 3, each including at least one material having a PTC effect. One such heating body 3 may be seen in greater detail in FIG. 2, together with corresponding portions of the two connection bodies 2. As it can be well appreciated in FIG. 1, the at least two connection bodies 2 have respective parts which are intermediate to two successive heating bodies 3, in the length direction L.

In various embodiments, the material constituting the heating body 3 is a polymer-based material (i.e., one comprising at least one polymer), designated by 3*a* in FIG. 2, preferably a composite material having a matrix formed by a polymer or by a mixture of a number of polymers and by a corresponding filler, for example an electrically conductive filler and/or a thermally conductive filler. In various preferred embodiments, the material 3*a* of a heating body 3 is a co-continuous polymeric composite with PTC effect, having a matrix that comprises at least two immiscible polymers and at least one electrically conductive filler in the matrix. In preferred embodiments of this type, at least one of the immiscible polymers is high-density polyethylene (HDPE), and at least one other of the immiscible polymers is polyoxymethylene (POM). The electrically conductive filler is preferentially constituted by particles, which have micrometric or nanometric dimensions, preferably comprised between 10 nm and 20 μm, very preferably between 50 and 200 nm, possibly aggregated to form chains or branched aggregates of dimensions comprised between 1 and 20 μm. Preferential materials for the electrically conductive filler are carbon materials, such as carbon black, or graphene, or carbon nano-tubes, or mixtures thereof.

HDPE and POM are preferentially in relative percentages comprised between 45% and 55% of their sum in weight. Preferentially, the electrically conductive filler is confined either totally or to a largest extent in the HDPE, in a weight percentage comprised between 10% and 45%, preferably between 16% and 30%, of the sum (100%) of the weight of the HDPE and the weight of the electrically conductive filler. For this purpose, the HDPE and the electrically conductive filler can be mixed together, in particular via extrusion, before subsequent mixing with the POM, which also in this case can be carried out preferentially via extrusion.

The high melting point of POM makes it possible to keep the two, HDPE and POM, phases better separated, reducing the possibility of migration of the electrically conductive filler in the POM (contributing to this effect is the fact that the filler is preferentially previously mixed with just the HDPE). The higher melting point of POM as compared to other known polymers likewise enables a more stable final structure to be obtained: the PTC effect of the composite material limits self-heating to a maximum temperature of approximately 120° C. POM moreover has a high crystallinity, roughly comprised between 70% and 80%: this means that, in the preferential co-continuous composite proposed, it is less likely for there to occur migration of charge from the HDPE to the POM, thereby preventing loss of performance of the PTC-effect material, for example due to heating and passage of electric current. The higher crystallinity of POM also renders the composite particularly resistant from the chemical standpoint and bestows high stability thereon. On the other hand, the crystallinity of HDPE is typically comprised between 60% and 90%: in this way, a high concentration of the conductive filler in the amorphous domains is obtained, with corresponding high electrical conductivity.

The heating bodies 3 of the semifinished product 1 are at a distance from one another in the length direction L and generally extend in a direction transverse thereto. In this way, in two opposite lateral end regions, here with reference to the width direction W, the material 3*a* of each body 3 can be electrically and mechanically connected to the two connection bodies 2. In various embodiments, such as the one represented, the bodies 3 have a prismatic shape, preferably a substantially parallelepipedal shape, but this does not constitute an essential characteristic of the invention.

As it can be seen in FIGS. 1-2, in various embodiments, the width of the connection bodies 2, or of the longitudinal elements which form them, corresponds to a limited fraction of the widths of the opposite major faces of the heating bodies; in this way, as it can be well appreciated from said figures, both connection bodies 2 may even be associated to one and the same major face of the heating bodies 3, one at a distance from the other in the width direction W, i.e., substantially parallel and laying substantially according to the same plane.

Each of the two connection bodies 2 comprises respective electrical- and mechanical-connection parts, some of which are designated by 2*a*, where associated to each heating body 3 are at least one first part 2*a*, belonging to one connection body 2, and one second part 2*a*, belonging to the other connection body 2. The aforesaid first and second parts 2*a* are preferably each associated to an aforesaid lateral end region of the body 3, here at one and the same major face of the body 3.

According to one aspect of the invention, the connection parts 2*a* include a mesh structure. In various embodiments, such as the one exemplified in FIGS. 1 and 2, each of the two connection bodies 2 is entirely made of a single piece having a mesh structure, for example an electrically conductive fabric or a metal netting. However, in other embodiments (some of which are exemplified hereinafter), each of the two connection bodies 2*a* is made up of a number of parts, which comprise at least one first longitudinal element that extends in the length direction L of the semifinished product 1 and a plurality of second elements that extend in a transverse direction with respect to the first element, with the aforesaid second elements that each provide a respective mesh structure, i.e., an aforesaid electrical- and mechanical-connection part 2*a;* in these embodiments, the first element that extends in the direction L does not necessarily have to have a mesh structure: however, the reduced width thereof, corresponding to a fraction of the width of the heating bodies, eases in any case the capacity of bending or deformation of the semifinished product, as well as its cutting into a number of sections or lengths.

According to one aspect of the invention, the mesh structure of the parts 2*a* is embedded or englobed at least partially in the corresponding heating body 3, i.e., in the PTC-effect material 3*a* in the corresponding end region.

At least partial embedding of the mesh structure can be obtained by getting, via mechanical pressure and/or heating (preferably, heating such as to soften or melt at least superficially the PTC-effect material 3*a*), the structure itself to penetrate into the corresponding heating body 3, on a face of the latter, or else by overmoulding at least part of the material 3*a* of the heating body 3 on the mesh structure, i.e., on the corresponding electrical- and mechanical-connection part 2*a*. The embedding operation is simplified by the reduced width of the bodies 2, or in any case by the fact that each embedded part defines an area—when seen in a plan view—which corresponds to a reduced fraction of the area of the corresponding major face of the respective heating body 3.

It is to be noted that in FIGS. 1 and 2 the mesh structure of the connection parts 2*a* is represented practically entirely in view, for reasons of greater clarity. However, as has been mentioned, according to the invention, the aforesaid structure is at least partially made to penetrate into the material 3*a* of the respective heating body 3, preferably in such a way that the mesh openings defined between the various meshes of the structure will be occupied by part of the material 3*a*. On the other hand, it is also possible to embed practically completely a portion of the mesh structure of a connection part 2*a* into the material 3*a* of a heating body 3, in particular when the aforesaid heating body is overmoulded on the corresponding connection parts 2*a*.

It is preferable for the connection parts 2*a,* i.e., their mesh structure, to extend substantially parallel to a major face of the corresponding heating body 3 (as it can be seen, in the case of FIGS. 1 and 2, the parts 2*a* are also substantially parallel to each other in the direction L). This ensures a good uniformity and a high intensity of the electric supply current between the connection bodies 2, which, as will be seen, are exploited for electrically supplying in parallel the various heating bodies 3. For this purpose, preferentially, the connection parts 2*a* hence extend in the length direction L and in the width direction W and are preferably substantially two-dimensional, i.e., of minimal thickness, substantially as a sheet or web structure; as has been mentioned, their width corresponds to a fraction of the width of the bodies 3.

In various preferred embodiments, the mesh structure is constituted by a fabric made at least in part of threads or wires of electrically conductive material, preferably metal material. Preferred metals may, for example, be selected from among stainless steel, copper, aluminium, brass, bronze, nickel-chromium-based alloys, or iron-chromium-based alloys. The electrically conductive fabric may be obtained via interweaving or criss-crossing of threads or wires using any known technique. For example, the type of weave can be selected from among the following:

- plain weave, where each thread of weft alternately passes over and under each thread of warp, and vice versa;
- twill weave, where each thread of weft passes over and under two threads of warp alternately;
- plain Dutch weave, where the threads of warp have a greater diameter than the threads of weft, with the weave that is made up of a small number of warp threads interwoven with a large number of weft threads;
- Dutch twill weave, which can be obtained via a weave similar to the plain Dutch weave, except that the weave is a twill weave and has a double layer of weft threads;
- reverse Dutch weave, which is substantially the reverse of the plain Dutch weave, i.e., with a higher number of finer warp threads and a lower number of thicker weft threads; and
- reverse Dutch twill weave, which is a weave similar to the previous one, but with each weft thread that passes over and under two threads of warp alternately.

Preferentially, the threads that provide the electrically conductive fabric have a small nominal diameter (i.e., before being woven), roughly comprised between 0.2 mm and 0.02 mm. The mesh opening of the fabric, i.e., the space or voids between two adjacent and parallel threads of the structure, is preferably comprised between 1 mm and 0.05 mm. As already mentioned, on the other hand, the mesh structure could be obtained also by processing an electrically conductive body; for example, a mesh or network structure suitable for the application may be obtained by making through incisions (staggered cuts) in a length of metal strap, which is then deformed or stretched until apertures or voids are obtained, for example substantially shaped like a rhombus or a square.

The fact that the mesh structure is at least partially embedded in the PTC-effect material 3*a* prevents the risks of separation or detachment of the connection parts 2*a* from the corresponding heating body 3, and notwithstanding this enables possible deformation of the material 3*a* and/or of the mesh structure due to the heating and cooling cycles. The fact that the mesh structure is in any case relatively dense and extensive ensures, however, a considerable current distribution and intensity.

As may be appreciated, the peripheral profile of the mesh structure that forms a connection body 2 may, for example, be easily obtained via elementary operations of cutting or dinking of a sheet or web of electrically conductive fabric or netting, or else the peripheral profile may be obtained via the aforesaid weaving processes. As will be seen, the aforesaid peripheral profile does not necessarily have to be quadrangular, as so far exemplified in the figures.

FIG. 3 is a schematic illustration of the case of a semi-finished product 1, the connection bodies 2 of which are formed by a web with mesh structure, for example an electrically conductive fabric, the electrical- and mechanical-connection parts 2*a* of which are substantially slotted or force-fitted into the heating bodies 3, i.e., via pressure and/or heating, on opposite regions of a face thereof, namely by getting the mesh structure to penetrate into the bodies 3. In embodiments of this sort, the bodies 3 can be obtained via operations of blanking or dinking starting from a sheet or web of the starting PTC-effect polymer, or else the bodies 3 can be injection moulded.

Using suitable equipment, the areas of the bodies 2 corresponding to the connection parts 2*a* are pressed or forcefully pushed, after prior possible heating, on the aforesaid face of each body 3, causing penetration therein of the corresponding portions of the mesh structure. For this purpose, in preferential embodiments, the manufacturing equipment used is configured for heating the bodies 3 in order to cause a modest softening thereof that facilitates penetration of the PTC-effect polymeric material into the openings of the mesh structures corresponding to the parts 2*a;* next, in particular after cooling of the bodies 3 (if heating thereof is envisaged), the pressure or thrust is interrupted and the semifinished product thus obtained can be removed from the equipment. As has been mentioned, this operation is eased by the reduced width of the connection parts 2*a,* i.e., of the corresponding bodies 2.

The semifinished product 1 may present in the form visible in the detail of FIG. 4 (see the detail A), with the meshes of the parts 2*a* partially exposed, i.e., only partially embedded in the material 3*a* or else the meshes of the parts 2*a* may be completely embedded in the material 3*a*.

The equipment used for the aforesaid purpose may be of any known conception, provided that it performs the functions described above. For instance, the equipment could be configured like a press, with a stationary element defining a plurality of seats for positioning of the bodies 3 and 2, with the bodies 2 locally set on top of the bodies 3, and a moving element that is designed to exert the necessary mechanical pressure on the bodies 2 at the parts 2*a*. In such a case, the stationary element could also be configured for heating the heating bodies 3, as mentioned above. In addition or as an alternative to the equipment may be configured for heating the connection bodies 2.

According to other embodiments, the equipment could also be configured as continuous-production machine, for example, one in which the two bodies 2 are supplied, starting from respective rolls or folded webs, at input to a workstation where the bodies 3 are loaded individually in order to be heated and then pressed against the bodies 2; at output from the aforesaid workstation the semifinished product 1 obtained is then rolled up or else folded on itself, for the purpose of storage.

Figure 6:
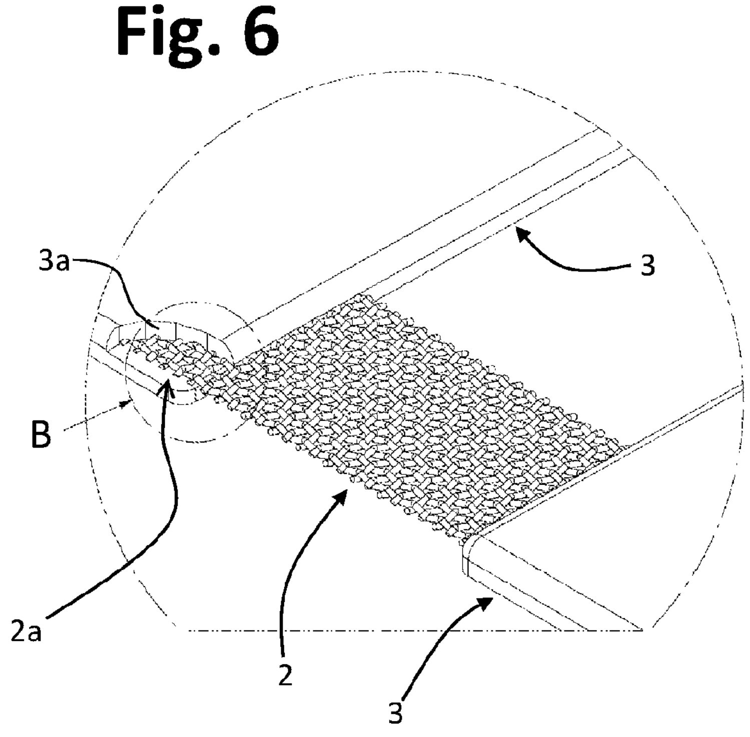
FIG. 6 illustrates the detail VI of FIG. 5.

FIG. 5 illustrates the case of a semifinished product 1, the heating bodies 3 of which are configured as bodies overmoulded on the connection bodies 2, especially at the corresponding parts 2*a*. In embodiments of this sort, for example, the two bodies 2 are inserted in a mould, so that their areas that are to obtain the connection parts 2*a* are located in a position corresponding to the impressions that are to define the bodies 3. The PTC-effect polymeric material 3*a* in the molten state, is then injected into the mould so that the bodies 3 thus formed enclose within them the respective parts 2*a* of the bodies 2. The semifinished product 1 may present as may be seen in the detail of FIG. 6 (see the detail B), with the meshes of the parts 2*a* completely embedded in the material 3*a* or else moulding of the bodies 3 may be carried out so that the meshes of the parts 2*a* will be partially exposed.

As has been mentioned, the heating bodies 3 are substantially stiff, or have in any case a lower flexibility or capacity for deformation than the connection bodies 2, so that the semifinished product 1 has, in its length direction L, an alternation of stiffer portions and less stiff portions. In this way, the stretches of the connection bodies 2 that extend between two successive heating bodies 3 provide in effect areas of articulation, or deformation, or compensation of the semifinished product 1. The aforesaid areas make it, for example, possible to vary the angular arrangement between the heating bodies themselves (see, for example, the lengths of semifinished product designated by 1' in FIGS. 48, 49, and 55) during steps of production of electric heater devices or other components that include at least one semifinished product according to the invention, or to vary, albeit to a minimal extent, the distance between the heating bodies, in particular in the length direction L, or again make it possible to recover any possible expansion or contraction due to temperature variations during use. As has been mentioned, the limited width of the above stretches of the connection bodies 2 with respect to the heating bodies 3 eases the capacity of bending or deformation.

In various embodiments, the areas of the connection bodies 2 in an intermediate position between the heating bodies 3 are coated at least partially by protective layers, made, for example, of material having a PTC effect, or else by an electrically and thermally conductive material, for example a conductive adhesive or a conductive coating layer, or else by an electrically insulating material, such as an insulating polymer.

Figure 7:
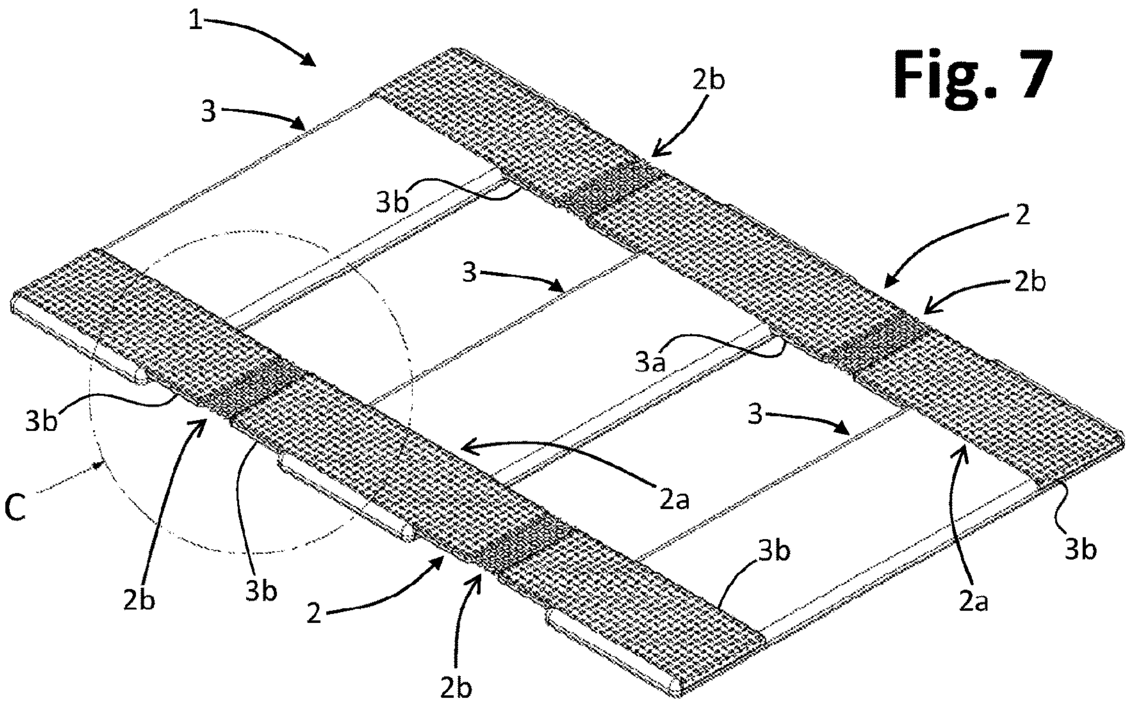
FIGS. 7 and 8 are perspective, partial, and schematic views of possible variant embodiments of a semifinished product of the type illustrated in FIGS. 3 and 5, respectively.

In preferential embodiments of this type, at least some of such intermediate areas of the bodies 2 are in any case at least partially exposed; i.e., they envisage openings or passages that may be useful for the purposes of electrical connection of the semifinished product 1. Illustrated in FIG. 7 is, for example, the case of a partial coating that is obtained by getting parts of the mesh structure of the bodies 2 to penetrate into thin layers 3*b* of PTC-effect material, which form part of the bodies 3, for example by applying mechanical pressure with preheating of the aforesaid material. As an alternative, it would be possible to get parts of the mesh structure of the bodies 2 to penetrate into thin layers 3*b* of PTC-effect material and then the bodies 2 provided with the partial coatings 3*b* to be made to penetrate into the material of the bodies 3.

In embodiments of this sort, the protective layers 3*b* may coat just one side of the mesh structure of the bodies 2, so that the opposite side can be made to penetrate more easily into the bodies 3, at their electrical- and mechanical-connection parts 2*a.* Of course, the protective layers 3*b* could also be overmoulded on the bodies 2, or else be applied thereto after coupling thereof to the bodies 3.

From FIG. 7, for example from the detail C, it may be noted how the protective layer 3*b* can present intermediate interruptions or discontinuities, designated by 2*b,* which leave corresponding areas of the mesh structure completely exposed. The aforesaid exposed areas of the mesh structure can be conveniently used for connection of electrical supply leads, here not represented, as described hereinafter with reference to FIGS. 9-15.

Figure 8:
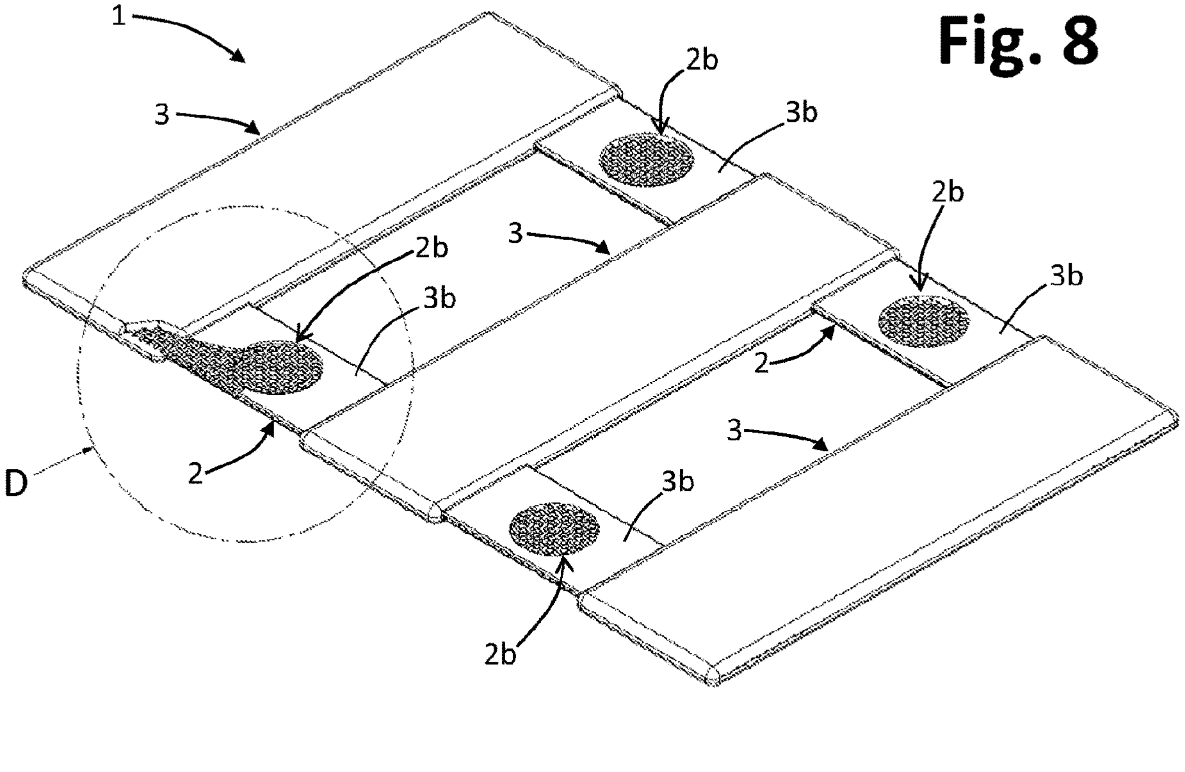

FIG. 8 illustrates the similar case of a semifinished product 1, the connection bodies 2 of which are provided with protective layers 3*b* in the intermediate areas between the various heating bodies 3. In the case of FIG. 8, and as may be appreciated from the detail D, the bodies 3 are bodies overmoulded on the connection bodies 2, as are the coating layers 3*b,* and are preferentially made of a polymeric material having a PTC effect. The layers 3*b* can possibly englobe practically entirely the aforesaid intermediate areas of the bodies 2. On the other hand, also in embodiments of this type, the coating layers 3*b* can present interruptions or passages 2*b,* aimed at enabling connection to the bodies 2 of possible power-supply leads, as described hereinafter with reference to FIGS. 9-15.

The coating layers 3*b* preferentially have a comparatively small thickness as compared to the heating bodies 3. A small thickness of the coating layers 3*b,* and a reduced width thereof, in any case guarantees the necessary flexibility or deformability of the areas of the bodies 2 intermediate between the bodies 3 in order to enable rolling up or folding of the semifinished product 1, in particular for the purpose of storage, and/or to enable shaping of the semifinished product 1, for example to adapt it to different contexts of installation. The small thickness of the coating layers 3*b*, and the reduced width thereof, in any case guarantees the necessary flexibility or deformability of the areas of the bodies 2 intermediate between the bodies 3 in order to enable also an appropriate compensation in regard to any possible expansion or contraction during temperature variations.

The various heating bodies 3 of a length of semifinished product can be electrically supplied by applying an electrical potential difference between the at least two connection bodies 2, for example by connecting supply terminals directly to one of the longitudinal ends of the aforesaid bodies 2 (as described hereinafter with reference to FIGS. 27 to 30). However, the potential difference can be applied to the bodies 2 also by way of electrical conductors, preferably flexible and/or at least in part electrically insulated, which extend in a direction transverse to the direction L of the length of semifinished product 1, for example when a number of lengths of semifinished product 1 are arranged alongside one another, in particular substantially parallel to one another, and are to be electrically connected together.

FIGS. 9-13 illustrate, in fact, the case of a length of semifinished product 1 provided with two electrical supply leads or cables 10, each of which is connected to a respective body 2. In the example, the cables 10 are provided with an electrical conductor 10*a* provided with an insulation sheath or coating 10*b*. The sheath 10*b* of each cable 10 has a respective interruption or discontinuity, in an area of a corresponding body 2 that is intermediate between two heating bodies 3. In this way, as may be noted in particular in FIGS. 10 and 13, an intermediate portion of the conductor 10*a* is directly exposed so that it can be associated and electrically connected, preferably via welding, to the corresponding body 2. The interruption or discontinuity of the sheath 10*b* preferably has a width substantially corresponding to that of the corresponding body 2 in order to favour a contact that is as extensive and planar as possible. As may be noted in FIG. 13, the exposed portions of the conductor 10*a* that are to make the connection with the bodies 2 can be provided with respective flat portions in order to improve contact with the aforesaid bodies 2 and facilitate welding thereto, preferably welding without filler material, such as electrical welding. The aforesaid substantially flat area of the conductor 10*a* can be obtained prior to welding, using appropriate equipment, or during welding, for example by means of an appropriate compression by welding electrodes, which could compress the conductor 10*a* on the connection body 2 during the corresponding welding operation.

As mentioned previously, provision of connection cables 10 that extend in a direction transverse to the direction L is particularly advantageous when it is necessary to connect together electrically a number of lengths of semifinished product 1 arranged side by side. As an alternative to connection cables 10, provided with an electrically insulating coating 10*b* of their own, leads of some other form could be provided, such as metal straps, even of a type not provided with an electrically insulating coating of their own (in this case envisaging further electrical insulation elements in the areas where the electrical cables 10 must not come into contact with the connection bodies 2).

Figure 14:
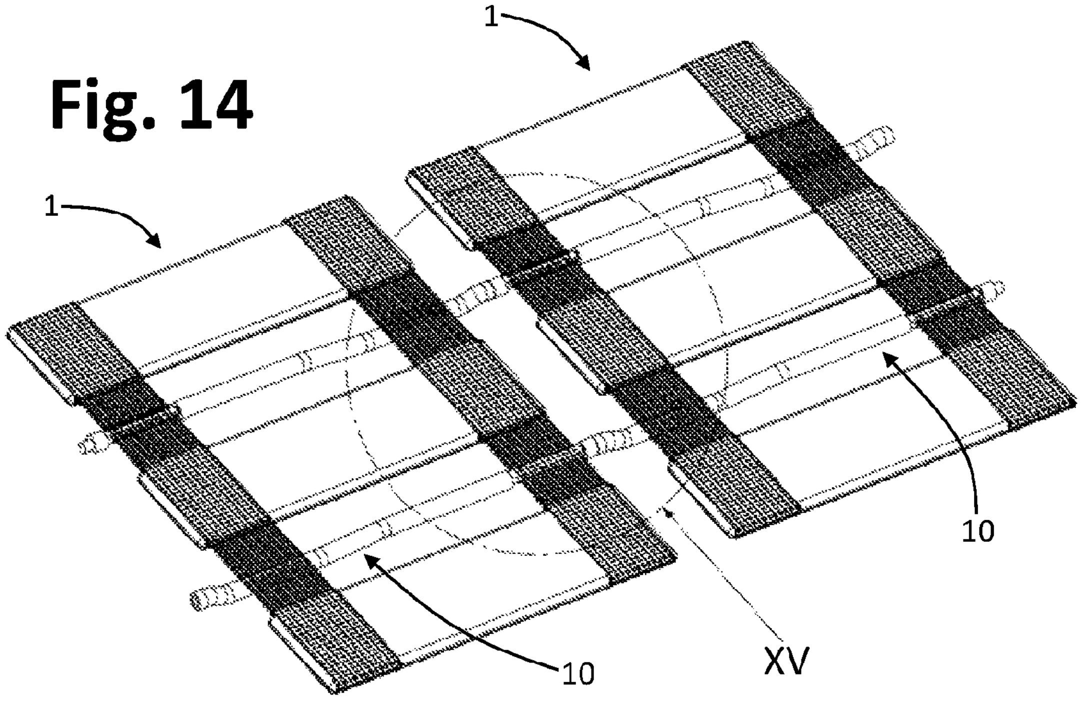
FIG. 14 is a perspective, partial, and schematic view aimed at illustrating a possible modality of electrical connection between a number of semifinished product according to possible embodiments of the invention.
Figure 15:
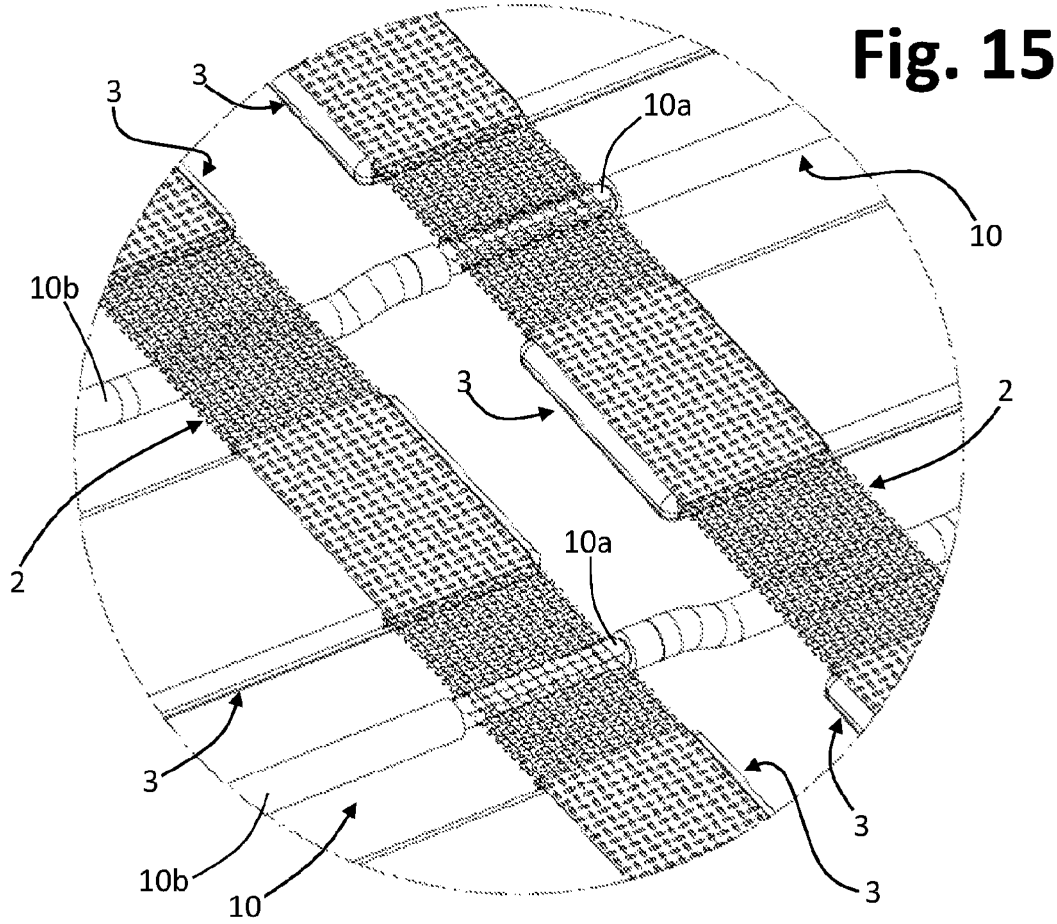
FIG. 15 illustrates the detail XV of FIG. 14.
Figure 16:
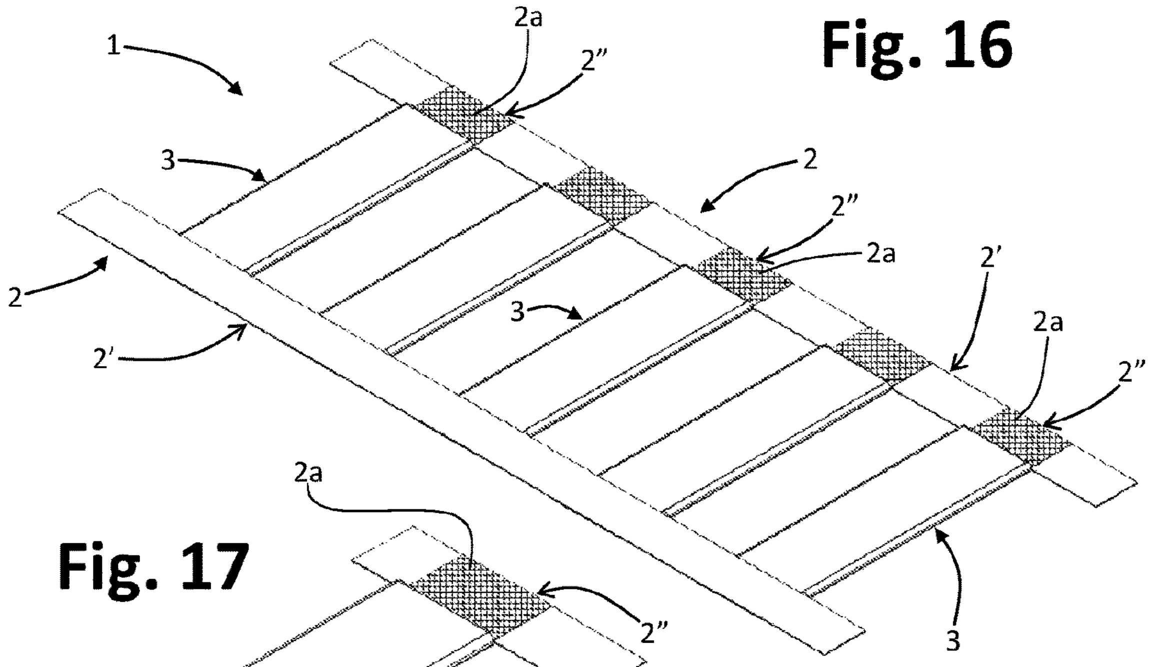
FIG. 16 is a perspective, partial, and schematic view of a semifinished product of an electric heater device according to further possible embodiments of the invention.
Figure 17:
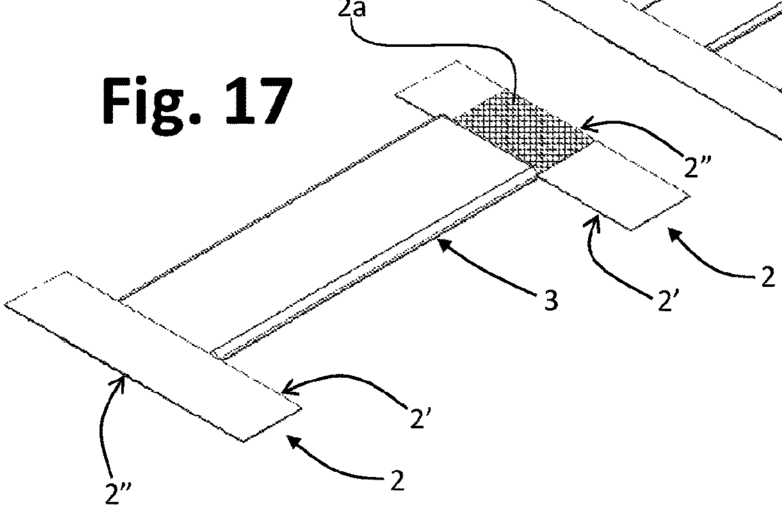
FIG. 17 illustrates a detail of FIG. 16.
Figure 18:
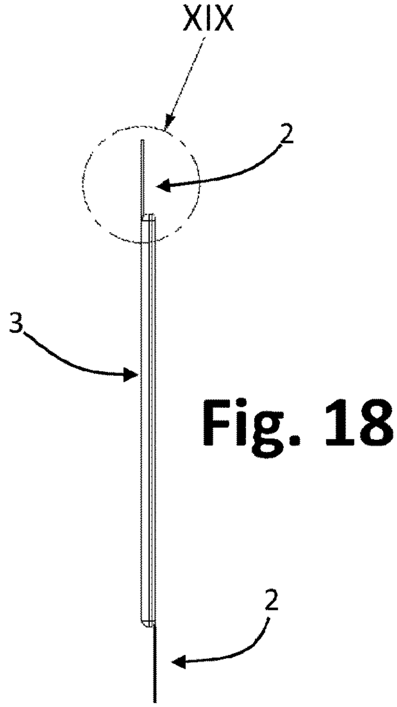
FIG. 18 is a view in side elevation of the semifinished product of FIG. 16.

FIGS. 14 and 15 are schematic representations of the case of two lengths of semifinished product 1 arranged substantially parallel to one another, and in this case the sheath 10*b* of each cable 10 has two interruptions, in positions corresponding to the two homologous bodies 2 of the two lengths, for the necessary electrical connection, according to what has already been described above.

In the embodiments so far described, each of the two connection bodies 2 is entirely formed by a single piece or element with mesh structure, for example a strip of electrically conductive fabric or of metal netting. This does not, however, constitute an essential characteristic, in so far as each body 2 could be formed by assembling a number of parts together.

FIGS. 16-19 illustrate the case where each of the two connection bodies 2 is made up of a number of parts, comprising at least one first element 2' that extends longitudinally in the length direction of the semifinished product 1 and has a limited width, corresponding to a fraction of the width of the bodies 3, and a plurality of second elements 2" that extend in a direction transverse to the first element 2' and that provide the connection parts 2*a*. At least the second elements 2" each comprise a respective mesh structure, having a first portion that is at least partially embedded or englobed in the polymer-based material of a corresponding heating body 3, in a corresponding end region, and a second portion that is instead fixed in electrical and mechanical contact to the first element 2', preferably at least in part overlying the first element 2'.

Hence, in the example of FIGS. 16-19, two elements 2" with mesh structure basically provide two electrical terminals for each body 3. In this case, each body 3 can thus be overmoulded on the corresponding elements 2", or else the two elements 2" can be made to penetrate into the corresponding body 3, according to what has been described previously so that a portion of each part 2" projects in any case on the outside of the body 3, for the purposes of connection to the respective longitudinal element 2', for example via welding, preferably welding without the use of welding consumable.

In various preferential embodiments, welding between the two parts in question is resistance welding, i.e., a pressure autogenous welding method in which the material is heated by an electrical resistor.

Overmoulding of the bodies 3 on the corresponding elements 2" can be obtained in a number of steps and/or with a number of materials, or else the two elements 2" can be bonded to the corresponding body 3, in particular via an electrically conductive bonding agent that is preferably also thermally conductive. As it can be noticed, in embodiments of this type, the mesh structure of each part 2*a* of a body 2 is associated to a major face of the heating bodies, and the mesh structure of each part 2*a* of another body 2 is associated to the other major face of the of the heating bodies 3.

Figure 19:
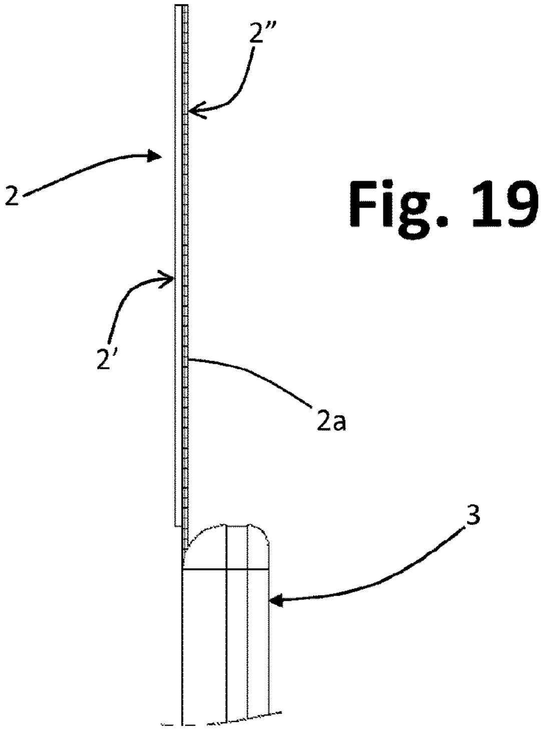
FIG. 19 illustrates the detail XIX of FIG. 18.

In the case exemplified, the projecting portion of the elements 2" faces and is welded on the surface of the respective element 2', as may be clearly noted, for example, in FIG. 19.

FIGS. 20-23 illustrate a similar case, in which, however, the elements 2" that provide the electrical- and mechanical-connection parts 2*a* have their portion projecting from the heating body 3 folded back on the longitudinal element 2', as emerges clearly, for example, from FIG. 23, in particular for the purposes of a smaller encumbrance of the semifinished product in the width direction. In embodiments of this type, the elements 2" can have a greater length than in the case of FIGS. 16-19.

It will be appreciated that, in embodiments of the type described with reference to FIGS. 16-19 and 20-23, or more in general in which the connection bodies 2 are made up of a number of assembled parts, the corresponding longitudinal elements—of the type designated previously by 2'—do not necessarily have to have a mesh structure: instead, they may have a full structure, for example formed by a metal strip or strap, preferably flexible or deformable, possibly deformable even in a plastic way. It will likewise be appreciated that in such cases the longitudinal elements do not necessarily have to have a flat shape or web shape: for example, they may be obtained from filiform elements, for example of a substantially circular section.

Obtaining of the connection bodies 2 in a number of parts 2', 2" may be useful for production purposes, in particular for associating—in a first manufacturing step—the connection parts 2*a*-2" to the heating bodies 3, and—in a subsequent manufacturing step—for associating the bodies 3 (i.e., their connection parts 2*a*-2") to the longitudinal elements 2'. This may be useful for producing and storing initially the bodies 3 provided with the corresponding connection parts 2*a*, and thereafter use them according to needs for obtaining semifinished products even distinguished by differentiated spacings between the corresponding heating bodies 3, so as to be enabled to obtain different configurations, with different distributions of heating elements, while maintaining unaltered the manufacturing equipment.

The proposed configuration allows for carrying out a continuous production while keeping the cycle time constant (avoiding machine downtimes or slowing down which might jeopardize the quality of the product), as well as a quality control on the performances of the single heating bodies 3, without compromising a semifinished product 1 as a whole.

By having longitudinal elements 2' with a smaller width than the body 3, the risk is also avoided of a short-circuit between the same elements 2', without the need of arranging an insulating element between the two elements 2'. Additionally, provided that the parts 2*a* have a smaller dimension than that of the bodies 3, the risk is avoided of a short circuit occasioned by the presence of possible scraps between the same parts 2*a* at a same heating body 3.

In the cases exemplified in FIGS. 16-19 and 20-23, the connection parts 2*a* of the bodies 2 are embedded or englobed at least partially in positions corresponding to the two opposite major faces of the heating bodies. As it can be noted, in any case, also with this arrangement the longitudinal elements 2' are substantially parallel and spaced from each other in the width dimension W, with an element 2' which does not extend above the other element 2' in the areas comprised between two heating bodies 3 (i.e., with a configuration of the semifinished product 1 which is anyway distinguished by an alternation of "voids", each delimited by two successive heating bodies 3 and by the corresponding stretches of element 2' that join said bodies 3).

The connection bodies 2 can be formed entirely by a mesh structure, but have a complex peripheral profile, for example substantially comb-shaped, so as to define respective electrical- and mechanical-connection parts 2*a* that project in a transverse direction. Such a case is represented schematically in FIGS. 24-26, where it may be noted how each body 2 presents, in a single piece, both a first longitudinal portion $\mathbf{2}_1$ that extends in the length direction of the semifinished product and a plurality of second portions $\mathbf{2}_2$ that extend in a transverse direction from the first portion $\mathbf{2}_1$. As may be inferred, also in embodiments of this type, the intermediate parts of the bodies 2 which extend between two successive heating bodies 3 have a width equalling a fraction of the width of the heating bodies 3, with each intermediate part of a connection body 2 that extends at a distance from the corresponding intermediate part of the other connection body 2, in the width direction W.

In the case exemplified, the second transverse portions $\mathbf{2}_2$ have a part folded back, which is partially embedded or englobed in the polymer-based material of the corresponding heating body 3, in an end region thereof. In such an embodiment, the bodies 2 may initially have a comb-shaped configuration and be arranged parallel, with the transverse portions $\mathbf{2}_2$ opposed and aligned with respect to one another. On the two bodies 2 there are then fixed and/or connected the various bodies 3, in particular by moulding or interpenetration, in such a way that the material of each of them englobes at least part of two respective opposite transverse portions $\mathbf{2}_2$, and next the longitudinal portions $\mathbf{2}_1$ are folded on the bodies 3, for example as emerges from FIG. 23, where the portion $\mathbf{2}_1$ of one body 2 is folded on the upper face of each body 3, whereas the portion $\mathbf{2}_1$ of the other body 2 is folded on the lower face of each body 3 in order to reduce the lateral encumbrance of the semifinished product. Obviously, the bodies 2 could also be arranged in such a way that their longitudinal portions are folded on one and the same face of the bodies 3, and it is likewise evident that the bending step is not strictly necessary in so far as the bodies 2 could maintain their initial comb-like shape, with their longitudinal portions $\mathbf{2}_1$ that extend at the sides of the opposite ends of the bodies 3.

By folding the portions $\mathbf{2}_1$ a reduction is obtained of the overall dimension in the direction W, or alternatively—this the same outer dimensions—a greater heating area is obtained. Furthermore, this comb-like configuration reduces the number of electrical connections (the portions $\mathbf{2}_1$ e $\mathbf{2}_2$ are in a single piece), so rendering the semifinished product stronger, from the reliability viewpoint.

Exemplified in FIGS. 27 to 33 is an electric heater device according to possible embodiments of the invention, namely, a device that integrates at least one length of semifinished product of the type designated previously by 1.

Figure 27:
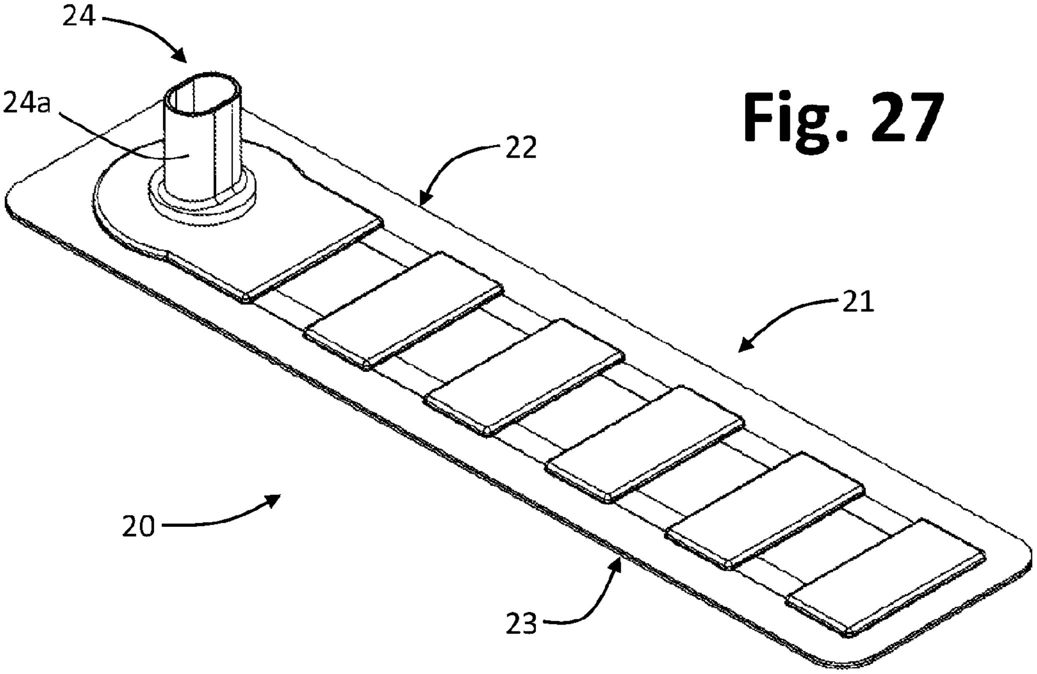
FIGS. 27 and 28 are schematic perspective views, from different angles, of an electric heater device according to possible embodiments of the invention.
Figure 28:
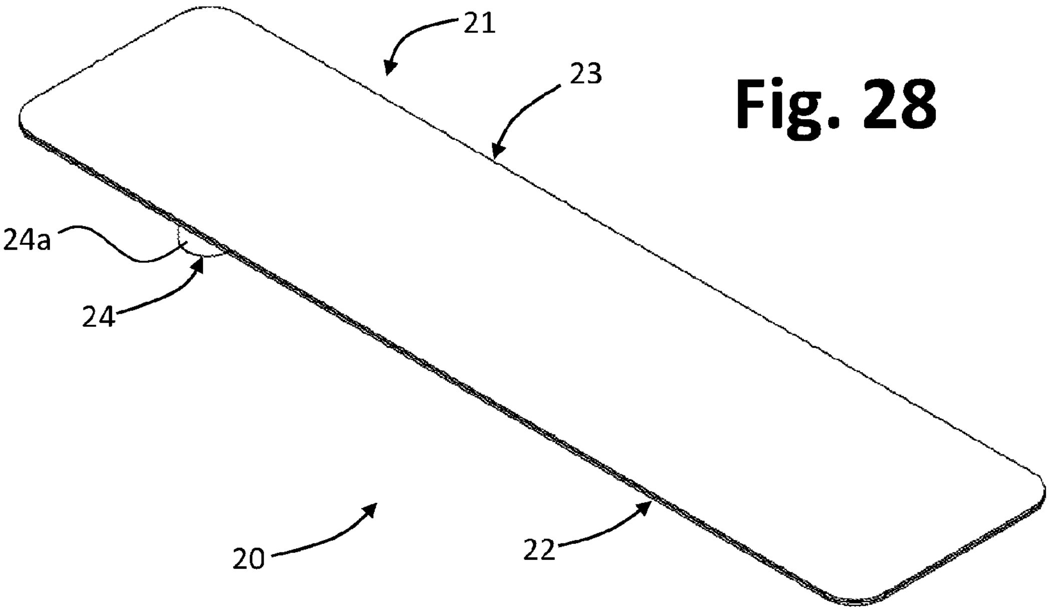

With initial reference to FIGS. 27-28, designated as a whole by 20 is the heater device. In what follows, assume that the device 20 belongs to an on-board system of a motor vehicle, for example a system for heating a flow of air or for heating a liquid that is contained in a tank or that flows in a duct. The device 20 comprises a casing body 21, which encloses at least partially at least one heating element comprising a length of semifinished product 1, the components 2 and 3 of which are represented in exploded view in FIGS. 29 to 30. The casing body 21 is preferentially made up of at least two parts 22 and 23 and is provided with an electrical connector 24 for connection to an electric power source. Instead of a casing body, the device 20 could include a supporting body, configured for supporting the at least one heating element, without necessarily enclosing it.

In various preferred embodiments, the casing body of the heater device according to the invention is made up of two or more parts associated to one another, but in other embodiments the casing may be obtained at least in part by overmoulding of material on at least one heating element of the device. The casing body may be of a hermetic type, namely, designed for enclosing in a fluid-tight way the heating element or elements of the device.

In various embodiments, the heater device forming the subject of the invention is configured as a stand-alone component, in which case its casing body is preferentially configured for being installed and/or fixed in a more complex system, for example the heating system of a motor vehicle. In other embodiments, the heater device is instead integrated in a component designed for performing also functions different from heating of a generic medium, in which case at least part of a body of the aforesaid component can be exploited to obtain at least in part also the casing body of the heater device.

In the case exemplified in FIGS. 27 and 28, the device 20 is configured as a stand-alone component, and its casing body 21 comprises the two parts 22 and 23, for example made of electrically insulating thermoplastic material, which can, for instance, be fixed together, preferably in a fluid-tight way, via gluing, or welding, or slotting, in order to enclose inside them at least part of the heating element including the length of semifinished product 1.

Preferably, at least part of the casing body of the heater device comprises at least one polymer, such as a high-density polyethylene (HDPE). Preferably, at least part of the aforesaid casing body is made of a material compatible with and/or that can be welded to the material of a different structure (such as a tank or a hydraulic duct), in which the aforesaid body is to be mounted, in particular for the purpose of mutual fixing via welding (for example, vibration welding and/or at least partial remelting of the respective materials).

Figure 29:
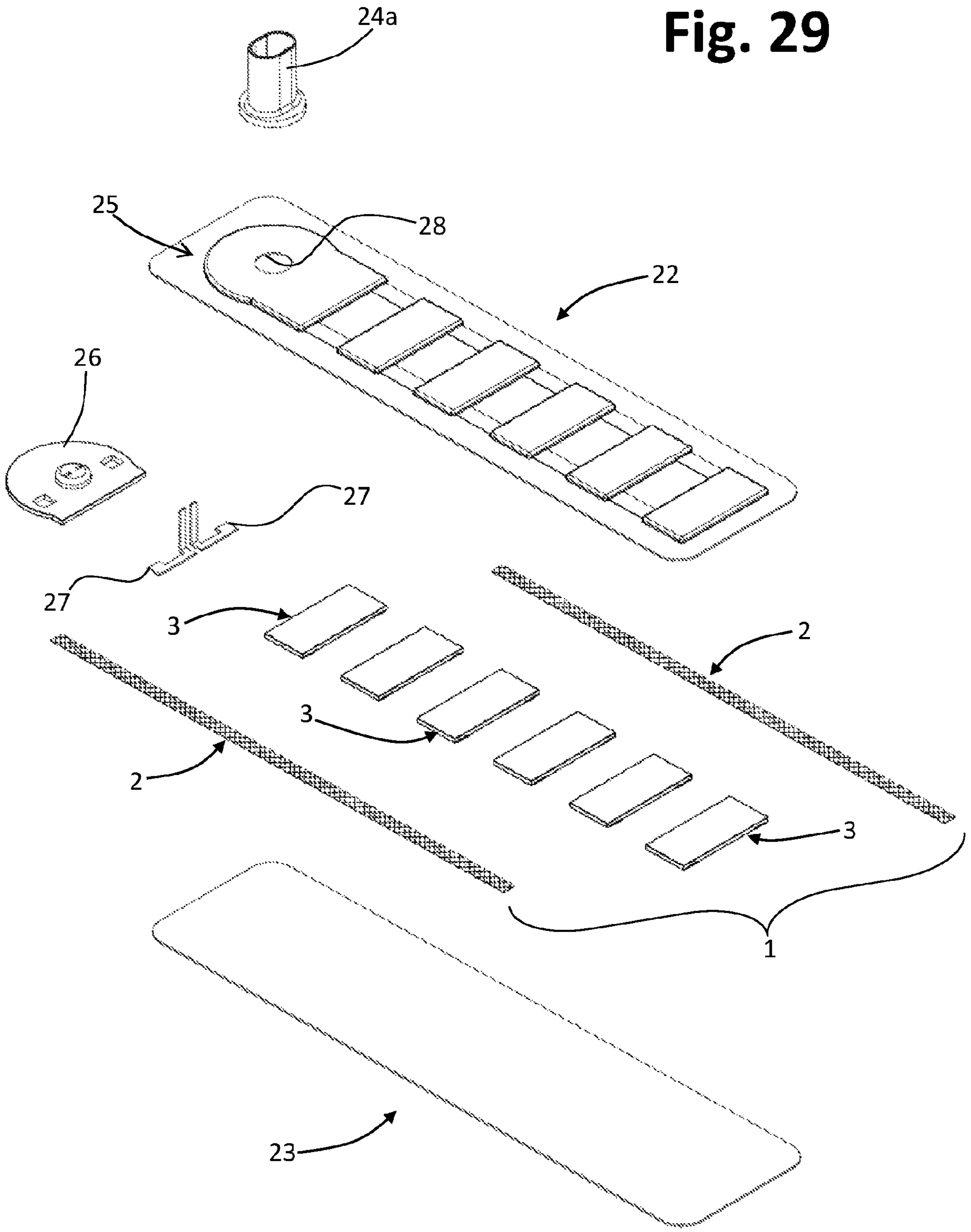
FIGS. 29 and 30 are schematic exploded views, from different angles, of the electric heater device of FIGS. 27-28.
Figure 30:
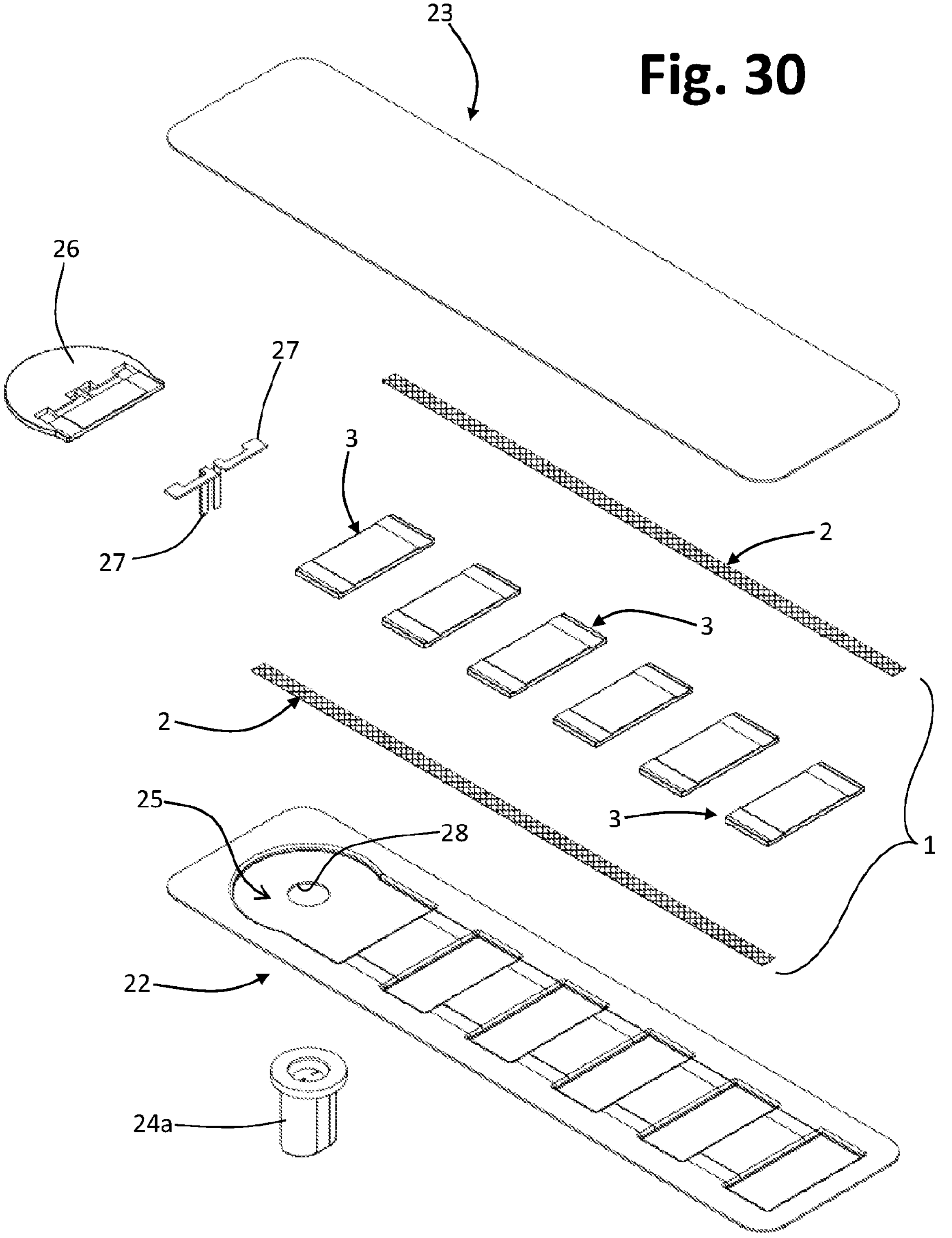
Figure 31:
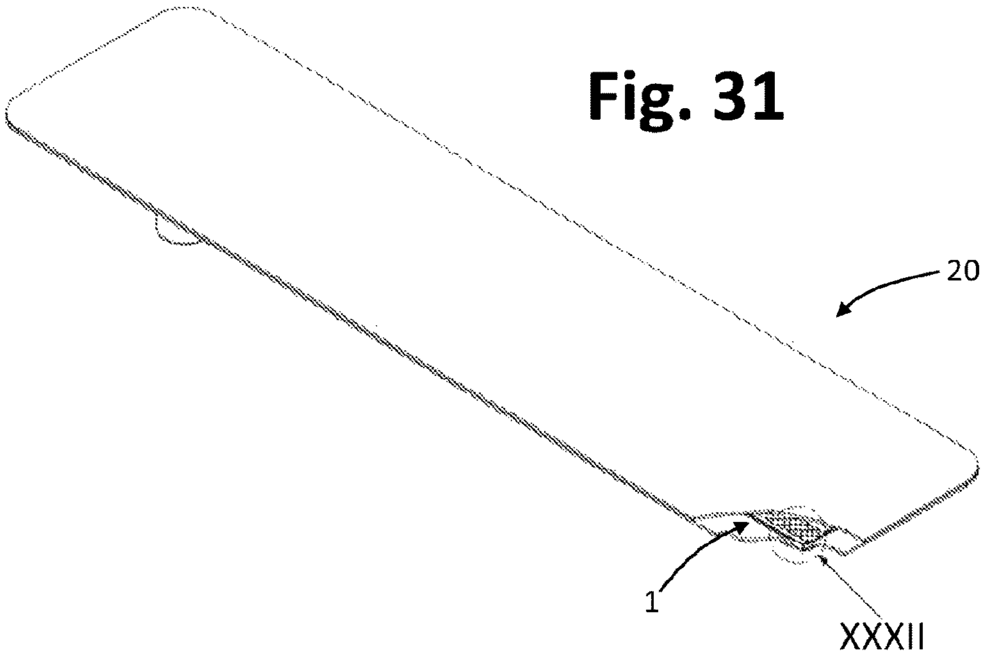
FIG. 31 is a view similar to that of FIG. 28, partially sectioned.
Figure 32:
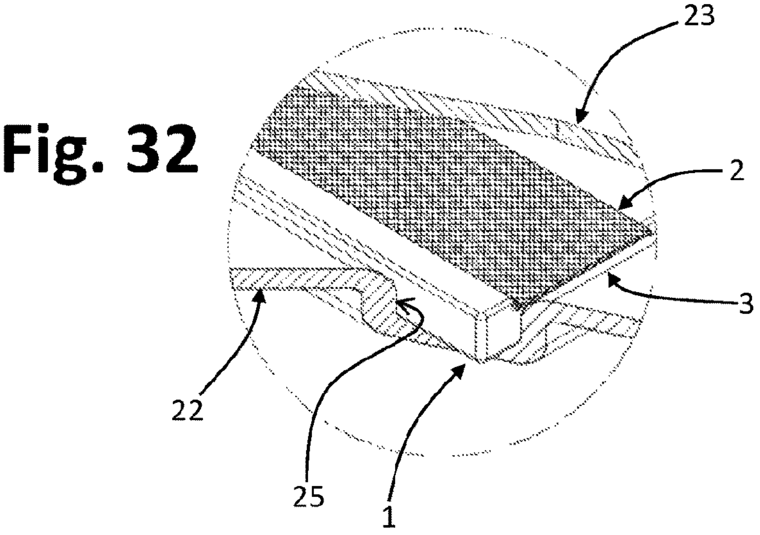
FIG. 32 illustrates the detail XXXII of FIG. 31.

As may be seen in FIGS. 29 to 30, in various embodiments, a casing part 23—which will here be assumed as constituting a front of the device 20—is substantially flat, i.e., substantially shaped like a plate, whereas the other casing part 21 is shaped so as to define a housing or seat 25 having a shape designed to receive at least the length 1. Preferentially, as exemplified in FIG. 30 and as may be appreciated also from FIGS. 31 and 32, the housing 25 has a profile at least in part complementary to that of the length 1 so as to ensure precise positioning thereof between the casing parts 22 and 23. As may be inferred from FIGS. 27-30, for the purposes of using casings of this type, the reduced width of the connection bodies 2 is advantageous, at least in the parts thereof which extend between the different heating bodies 3, and it is additionally advantageous that the connection bodies 2 can be associated—if need be—to one and the same face of the heating bodies 3, i.e., they may lay substantially according to one and the same plane.

In various embodiments, the housing 25 is also shaped for receiving a positioning element 26 for a pair of electrical terminals 27, set in electrical contact with the connection bodies 2 of the length 1. In the case exemplified, the positioning element 24 and the terminals 27 are shaped so as to project in a direction transverse or orthogonal to a plane identified by the length 1, through an opening 28 defined in the casing part 22, where a connector body 24*a*, configured for receiving inside it part of the terminals 27 and thereby providing the connector 24, is mounted.

In various preferential embodiments, the casing parts 22 and 23 are welded together, for example via vibration welding, while a tool or template compresses them against one another, in particular in the areas around the heating elements 3, thus preventing or reducing the presence of air within the device. In this way, the risk of possible operating faults of the device is prevented or reduced: the presence of a high amount of air within the device could in fact bring about significant expansions during the operating steps of heating of the device. The reduced width of the bodies 2 is also advantageous for these purposes.

Figure 33:
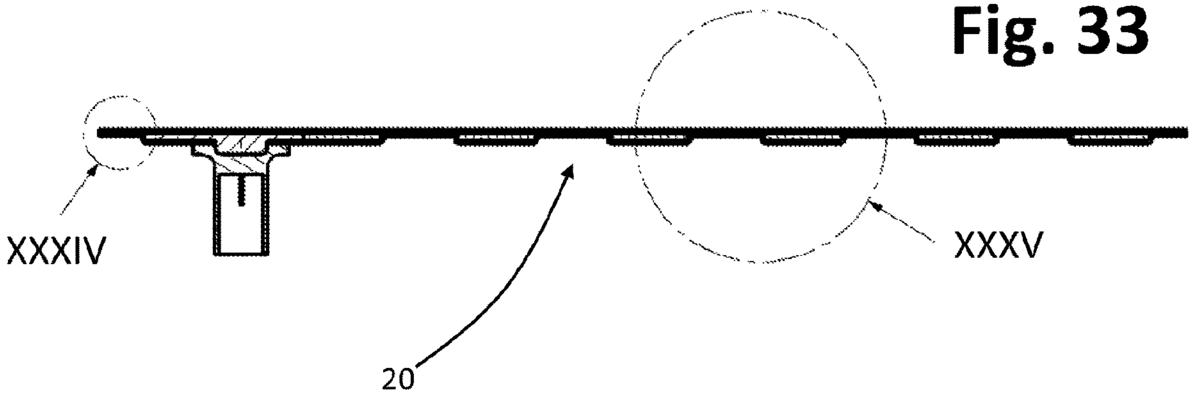
FIG. 33 is a schematic lateral section of the electric heater device of FIG. 28.
Figure 34:
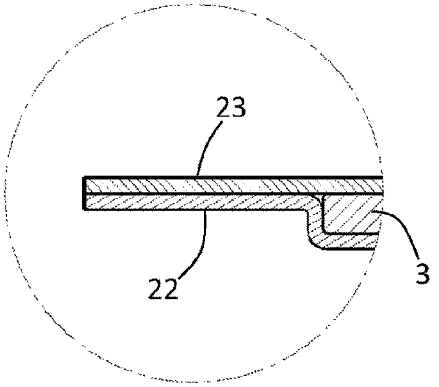
FIGS. 34 and 35 illustrate the details XXXIV and XXXV of FIG. 33, respectively.
Figure 35:
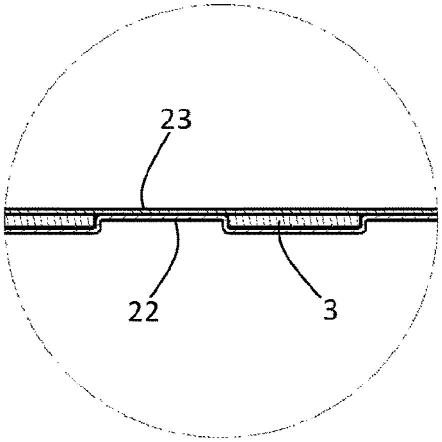
Figure 36:
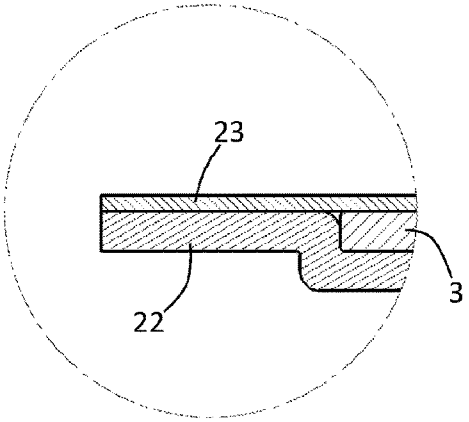
FIGS. 36 to 37, 38 to 39, 40-41, 42-43, 44-45 are details similar to those of FIGS. 34 to 35, regarding further possible embodiments of the invention.
Figure 37:
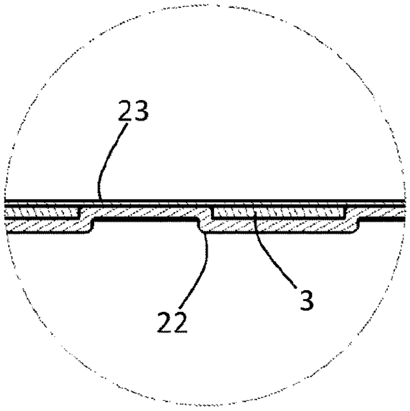
Figure 38:
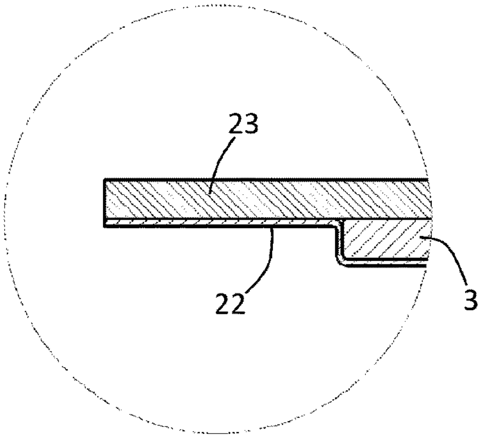
Figure 39:
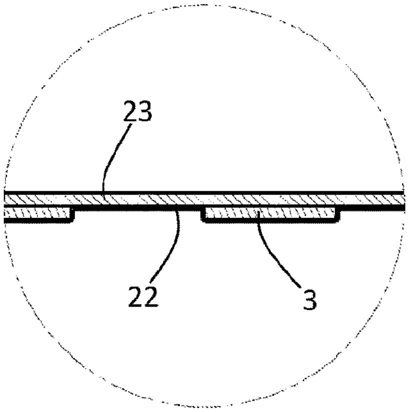

Visible in FIGS. 33 to 35 are some sections of the device 20, from which it may be noted how, in various embodiments, the two casing parts 22 and 23 may have substantially the same thickness. FIGS. 36 to 37 and 38 to 39 show instead how, in other embodiments, the casing part 22 may be thicker than the casing part 23, or else the part 23 may be thicker than the part 22. The choice of different thicknesses can depend upon the type of application of the device 20, for example when—according to its installation in the working position—it is necessary to obtain an emission of heat that is substantially the same at the front and at the back of the device 20 (FIGS. 34 to 35), or else it is necessary to favour emission of heat at the front (FIGS. 36 to 37) or else at the back (FIGS. 38 to 39). Of course, the thicknesses and materials used for producing the casing parts 22 and 23 may vary according to the needs, provided that these materials in any case are such as to enable emission of heat by the device 20.

In an advantageous embodiment, at least one of the two casing parts comprises a polymer added with fillers or particles that are thermally conductive but electrically insulating; i.e., the material of at least part of the casing body could be electrically insulating but thermally conductive (for example, an HDPE added with boron-nitride particles), in particular to improve thermal exchange between the heating bodies 3 and the environment external to the casing body, for example with as compared to the liquid contained in a tank or duct in which the device can be mounted.

Figure 40:
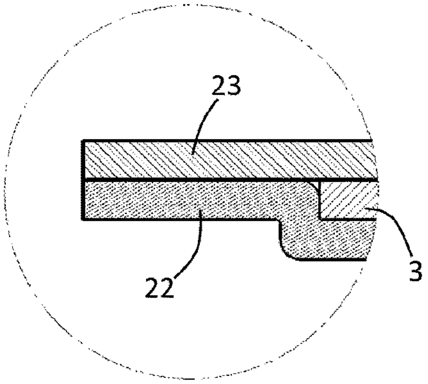
Figure 41:
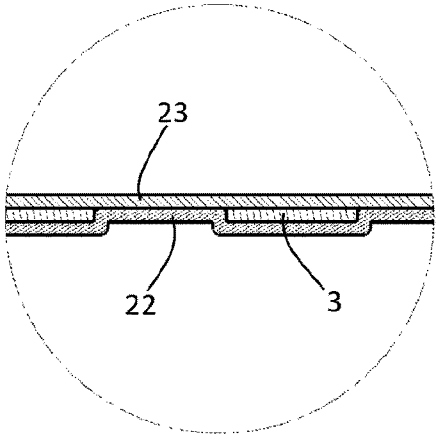

FIGS. 40-41 illustrate the case of casing parts 22 and 23 having substantially the same thickness, but comparatively much thicker than the ones illustrated in FIGS. 34 to 35. The possible addition of a thermally conductive filler may, where so required, improve thermal conductivity and/or heat exchange through the walls of the casing body 21, also in the case of the aforesaid thicker casing parts 22 and/or 23.

In general, preferential thicknesses for the casing parts 22 and 23 can range from 0.1 mm to 2 mm. The combination of parts 22 and 23 of different thicknesses can also be exploited for modulating the flexibility/stiffness of the heater device as a whole, according to the production needs and the requirements of installation of the device itself.

Figure 42:
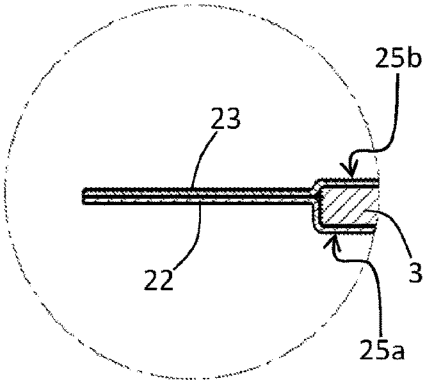
Figure 43:
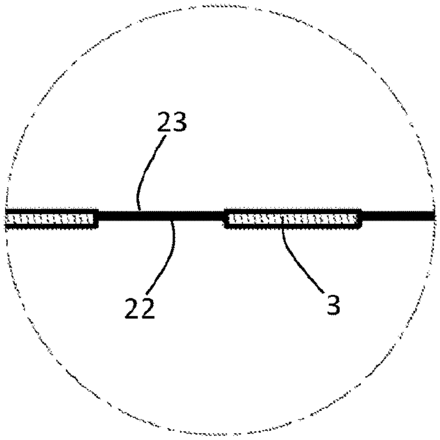
Figure 44:
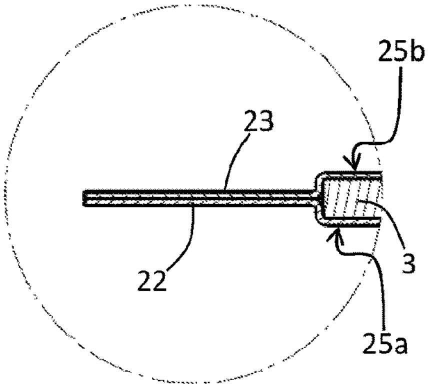
Figure 45:
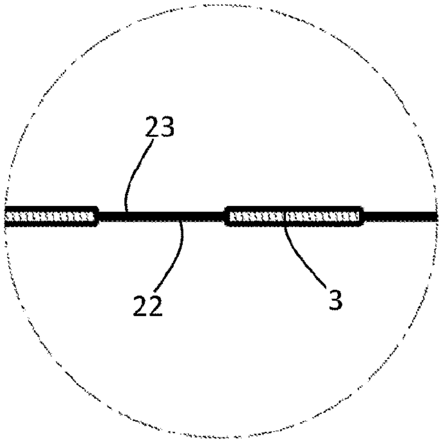

In the cases illustrated in FIGS. 27-41, the housing 25 for the length of semifinished product 1 is entirely defined in just one of the casing parts, in particular the part 22. However, in other embodiments, the two casing parts could define respective parts of the aforesaid housing. For instance, FIGS. 42-43 illustrate a configuration of the housing that is asymmetrical with respect to a plane identified by the length 1, with a larger portion 25*a* of the housing that is defined in one of the two casing parts (here the part 22) and a smaller portion 25*b* of the housing that is defined in the other casing part (here the part 23). FIGS. 44-45 show, instead, the case of a substantially symmetrical conformation of the housing defined by the two casing parts 22 and 23, where, namely, each of these parts substantially defines one half 25*a*, 25*b* of the housing.

One or both of the casing parts 22, 23 can advantageously be pre-formed via thermoforming in order to define the housing 25 or a respective part 25*a* or 25*b* thereof. On the other hand, if at least one of the two parts 22, 23 is sufficiently thin, in particular in the form of a film of relatively small thickness (for example, 0.35 mm), the shaping of the housing 25 or of the part of housing 25*a* or 25*b* in the film can be obtained using a template used for welding together the two casing parts, in particular a template used for purposes of vibration welding. Also one such operation may be eased due to the reduced width of the bodies 2.

FIGS. 46-49 exemplify an electric heater device according to further possible embodiments of the invention, namely, a device that integrates a plurality of lengths of semifinished product of the type designated previously by 1. The concepts expounded previously with reference to FIGS. 27-45 apply also in relation to devices according to FIGS. 46-49, where the same reference numbers are used to designate elements that are technically equivalent to those already described above.

The device 20 of FIGS. 46-49 basically differs from that of FIGS. 27-45 on account of the use of a plurality of lengths of semifinished product 1 and on account of a different general conformation of the casing body 21. In various embodiments, such as the one represented, the casing body has at least one inclined portion 29, with respect to a general plane of the casing itself. Moreover, in various embodiments, the device 20 has a through opening, designated as a whole by 30 in FIGS. 46-47, which is defined by corresponding openings 30*a,* 30*b,* aligned with respect to one another, of the two casing parts 22 and 23. The device 20 may, for example, designed to be set inside a container, for example a vehicle tank, with the through opening 30 that is located at a passage of the aforesaid tank, for example an outlet passage. Such an application may, for example, be useful when the tank in question is to contain a substance subject to freezing (for example, water or a water-urea solution), with the heater device 20 that is mounted at a bottom of the aforesaid tank, to prevent freezing or obtain unfreezing of the aforesaid substance, so that the latter can flow through the outlet of the tank. In an application of this type, the presence of one or more inclined portions of the casing body 21 may be due to the need to adapt the shape of the device to that of the tank.

In the version of device 20 represented in FIGS. 46-49, a plurality of lengths 1 are arranged alongside one another, for example substantially parallel to one another. The housing 25 defined by one of the two casing parts 22, 23, or by both of the aforesaid parts (see what is described with reference to FIGS. 42-43 and 44-45), is shaped accordingly. Preferably, a portion of the housing 25 also extends at the inclined portion 29, defined by respective portions 29*a*, 29*b* of the casing parts 22, 23.

Figure 48:
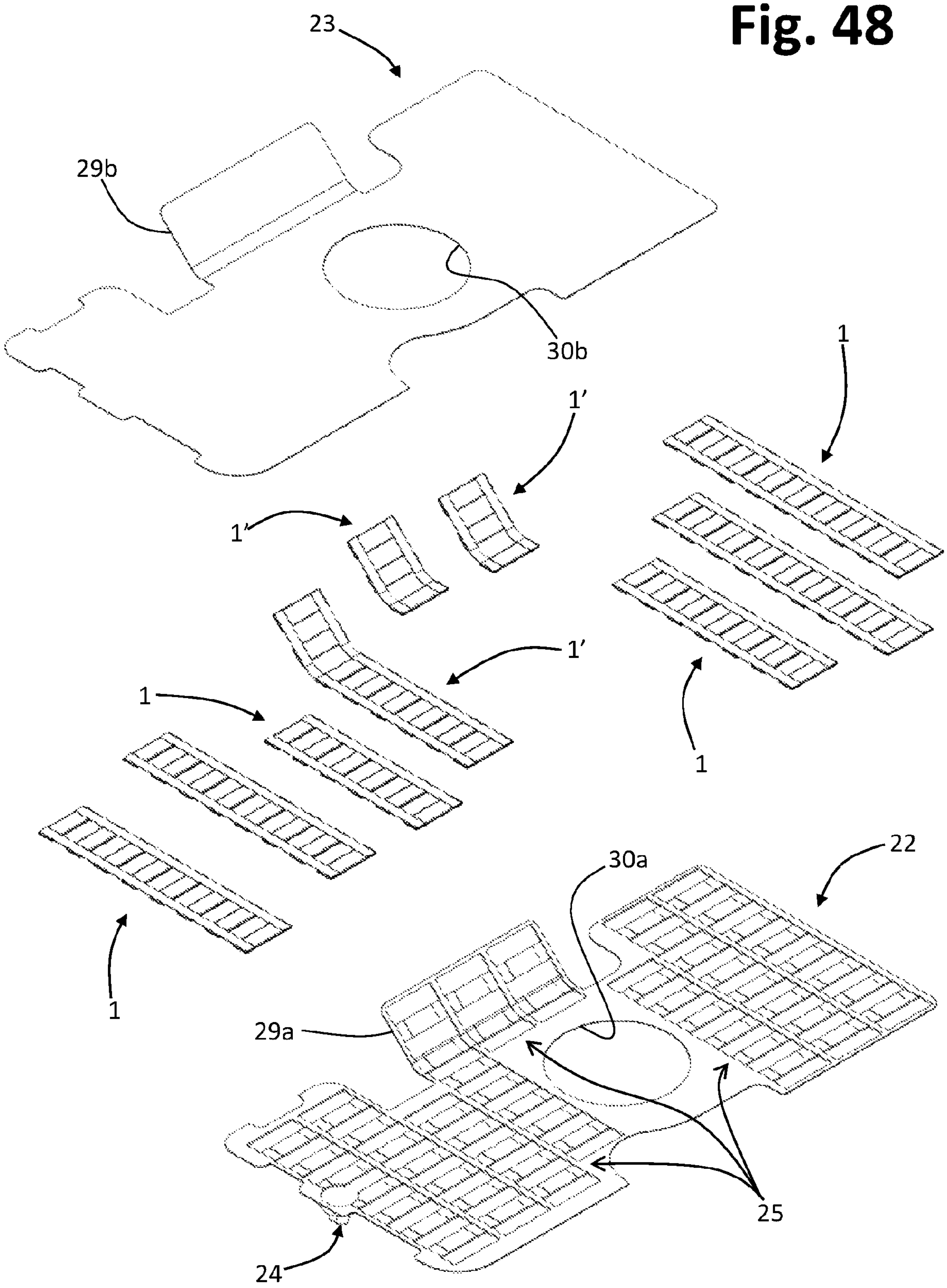
FIGS. 48 and 49 are schematic exploded views, from different angles, of the electric heater device of FIGS. 46-47.
Figure 49:
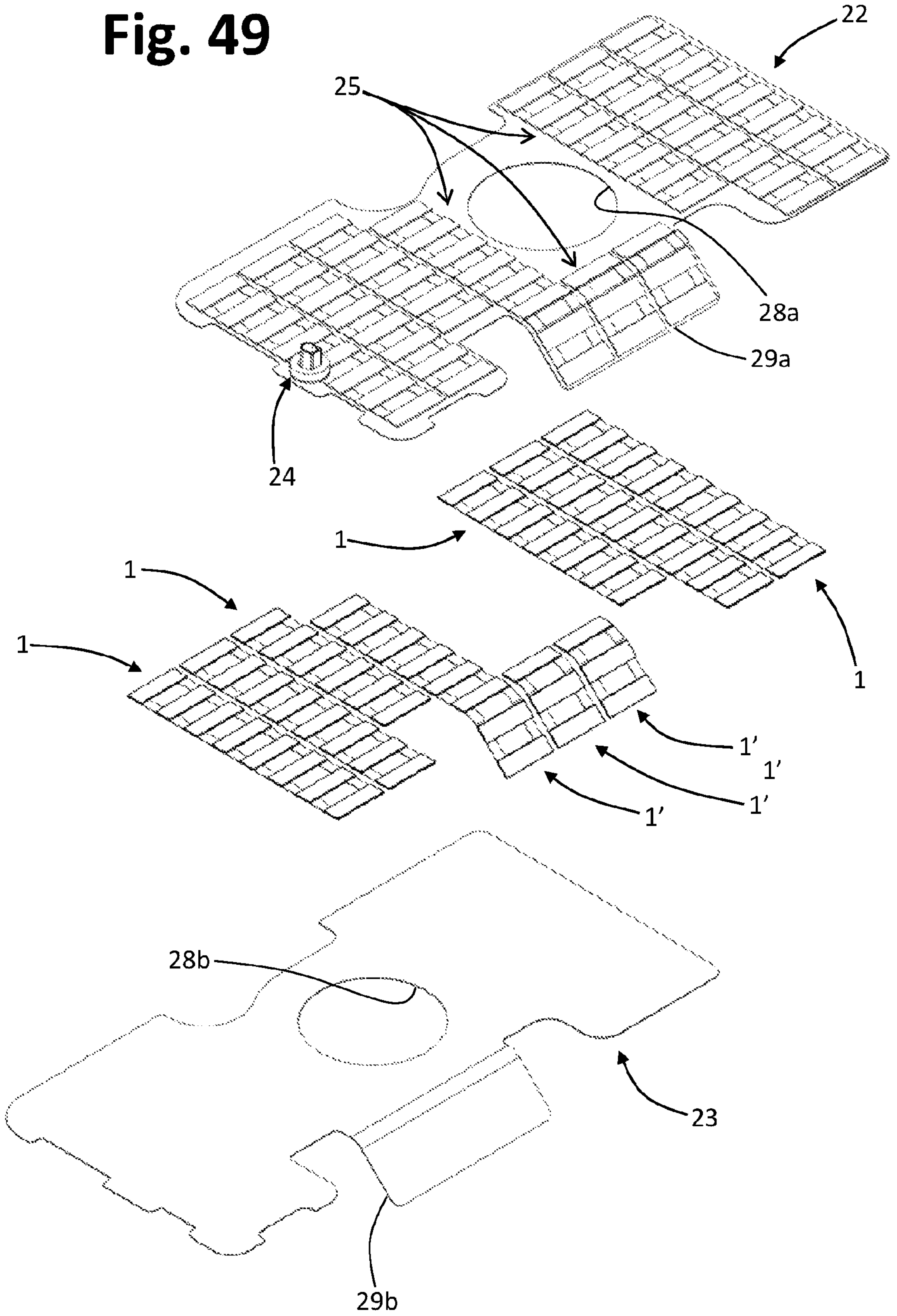
Figure 50:
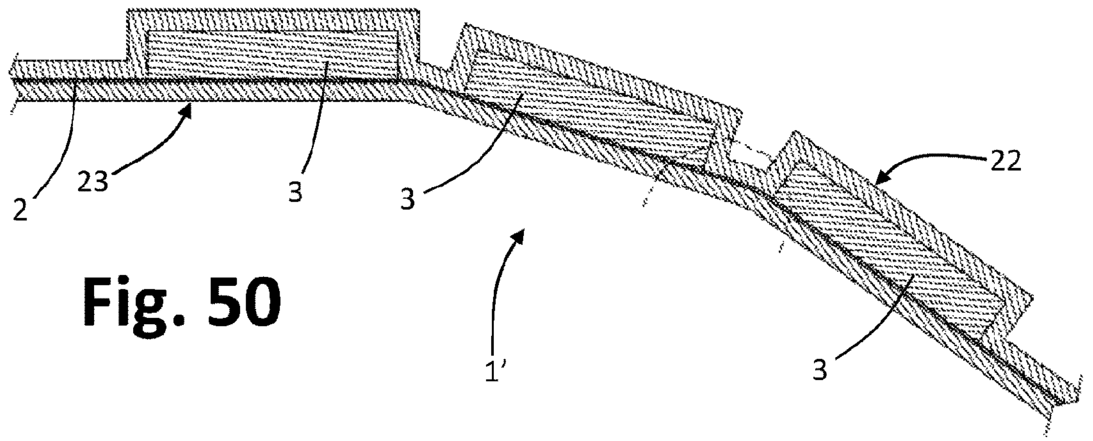
FIGS. 50, 51, and 52 are partial and schematic cross-sectional views aimed at illustrating possible alternative configurations of inclination of an electric heater device according to possible embodiments of the invention.
Figure 51:
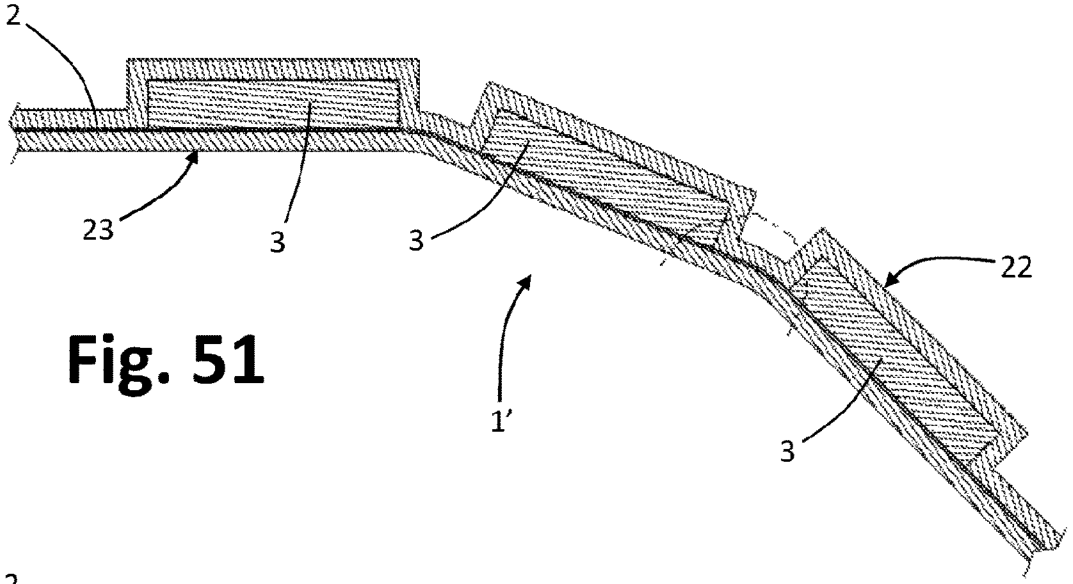
Figure 52:
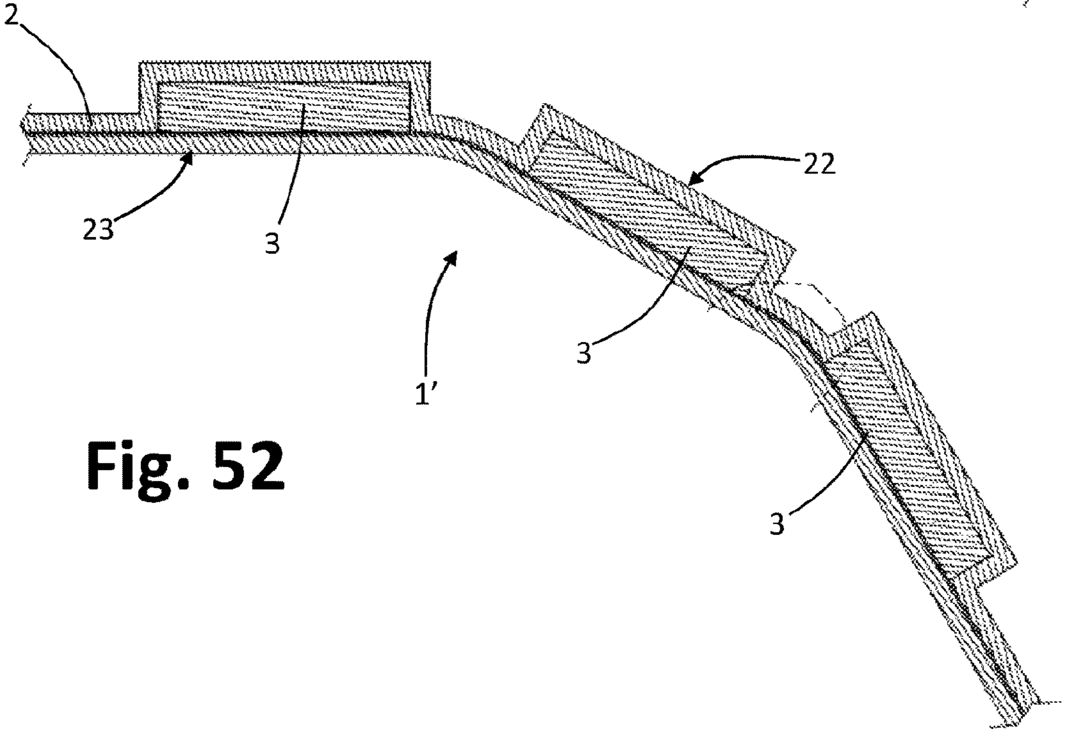

In various embodiments, one or more lengths of semifinished product are located within the casing 21 in a generally bent or curved configuration, as for the lengths designated by 1' in FIGS. 48-49, which are to extend in part in the main plane portion of the device 20, and in part in its inclined portion 29. The aforesaid bent or curved shape of the lengths 1' is allowed by their elasticity, i.e., by the bending capacity of the corresponding connection bodies 2, or else by their deformability, including plastic deformability, according to what has been described previously. FIGS. 50, 51, and 52 exemplify schematically, for this purpose, different possible configurations of bending or curving a length 1'.

It will be appreciated that the casing 21 of a heater device according to the invention may be of a rigid type, for example with its parts moulded with the desired curvature or inclination, in which the length or lengths 1 is/are then enclosed; as an alternative, however, the device 20 could be initially obtained with a rigid and plane casing 21 (for example, as in FIGS. 27-28), which subsequently undergoes deformation, preferably hot deformation, to assume the desired final shape, for example at least in part arched, or with linear stretches that follow a generally curved profile, or again there could be obtained a device with a casing 21 that is at least in part flexible, or comprising one or more articulation areas, capable of adapting autonomously to the environment where the device is installed (for example, a tank).

Figure 53:
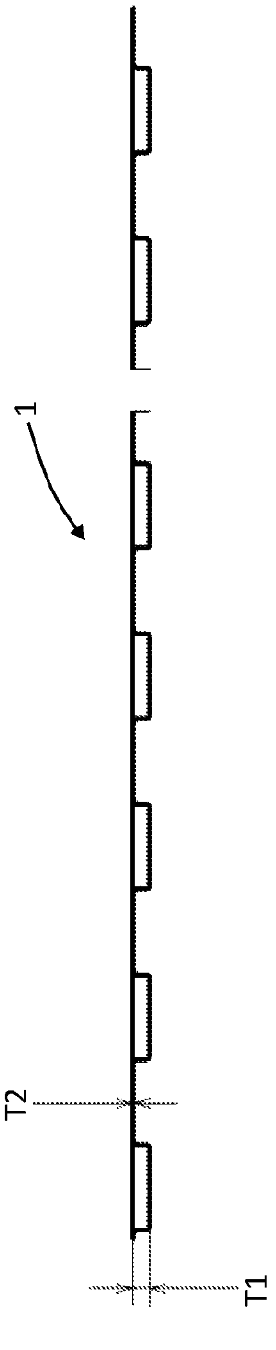
FIGS. 53 and 54 are a lateral schematic view and a top plan view of a semifinished product of the type illustrated in FIG. 1.
Figure 54:
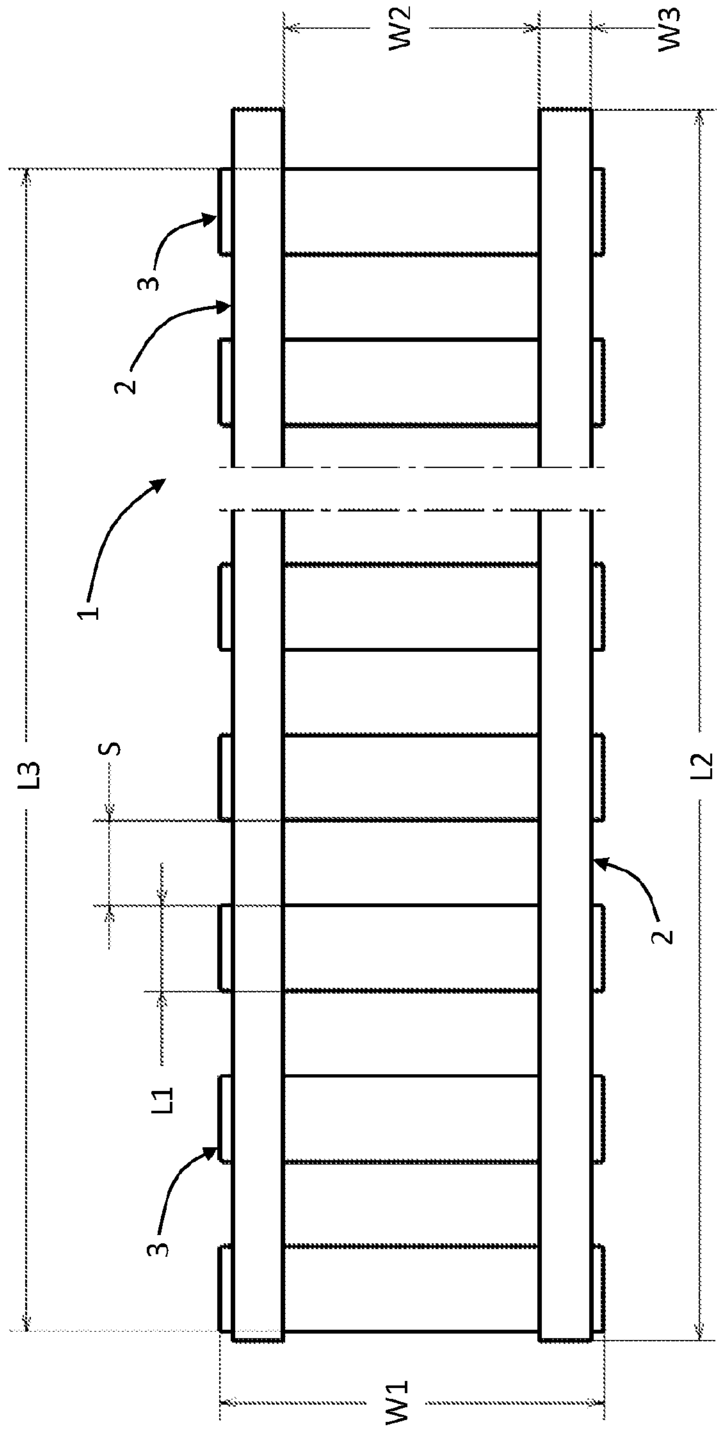
Figure 55:
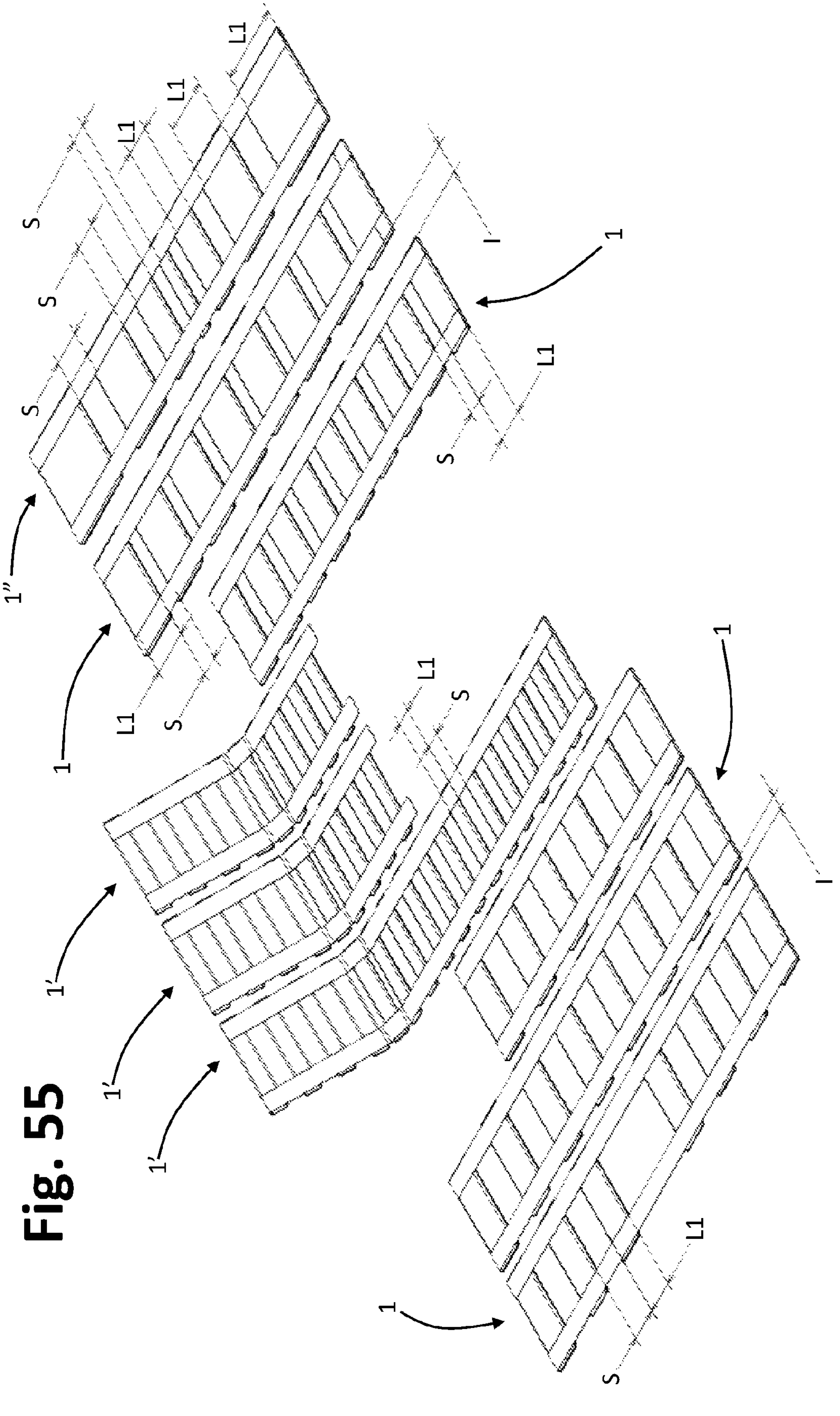
FIG. 55 is a schematic perspective view of a plurality of semifinished products that can be used for producing an electric heater device of the type illustrated in FIGS. 46-49.

The distribution of the electric power and heating capacity of a semifinished product 1 according to the invention, or else of a device that uses it, can be easily varied in the production step in various ways, for example by means of variation of the length dimension of the heating bodies, i.e., the dimension denoted by L1 in FIGS. 53-54 and 55 (the term "length" in relation to the bodies 3 is intended as referring to the length dimension L of the sections or lengths 1). It should be noted, for example with reference to the section or length designated by 1" in FIG. 55, that one and the same semifinished product 1 may include an alternation of bodies 3, which have different lengths L1.

In addition or as an alternative, the distribution of electric power and heating capacity of a semifinished product 1 can be obtained in the production step by varying the distance between the heating bodies 3, i.e., the dimension denoted by S in FIGS. 53-54 and 55. In this perspective, for example, one and the same semifinished product may include an alternation of bodies 3 at a first distance S apart from one another and of bodies 3 at a second distance S apart from one another.

Another possibility still for distribution of electric power and heating capacity of the heater device 20 that uses a number of lengths 1 arranged alongside one another is to vary the distance between the lengths themselves, as indicated by the dimension I in FIG. 55.

Without prejudice to the fact that the type of embodiment proposed makes it possible to have the maximum flexibility in terms of electric power, practical tests conducted by the present applicant have made it possible to define the following preferential sizings:

dimension L1: from 5 to 50 mm, preferably from 10 to 30 mm;

dimension S: >5 mm, preferably from 10 to 20 mm;

dimension I: >5 mm.

Once again preferentially:

- the width of the heating bodies 3, i.e., the dimension denoted by W1 in FIG. 54, is comprised between 30 and 80 mm, preferably from 45 to 60 mm;
- the thickness of the heating bodies 3, i.e., the dimension T1 in FIG. 53, is comprised between 0.5 and 5 mm, preferably between 1 and 3 mm;
- the distance between the connection bodies 2, i.e., the dimension denoted by W2 in FIG. 54, is comprised between 20 and 60 mm, preferably from 35 to 55 mm;
- the width of the connection bodies 2, i.e., the dimension denoted by W3 in FIG. 54, is comprised between 1 and 20 mm, preferably from 5 to 15 mm;
- the thickness of the connection bodies 2, i.e., the dimension T2 in FIG. 53, is comprised between 0.05 and 2 mm, preferably between 0.08 and 0.8 mm;
- the "outer length" of a section or length of semifinished product 1, understood as distance between the opposite ends of each connection body 2, i.e., the dimension denoted by L2 in FIG. 54, is up to 1050 mm, preferably between 250 and 850 mm;
- the "inner length" of a section or length of semifinished product 1, understood as distance between the two opposite sides of the two end bodies 3, i.e., the dimension denoted by L3 in FIG. 54, is up to 1000 mm, preferably between 200 and 800 mm;
- the ratio between the dimensions W1 and L1 (W1/L1) is between 0.6 and 16, preferably between 2 and 7;
- the ratio between the dimensions L1 and S (L1/S) is between 0.25 and 5, preferably between 1 and 3;
- the ratio between the dimensions W3 and W1 (W3/W1) is between 0.03 and 0.5, preferably between 0.11 and 0.3.

In general, the power density at the electrical- and mechanical-connection parts 2*a* depends upon the specific modalities of coupling between the connection bodies 2 and the heating bodies 3. For instance, connection configurations of the type described with reference to FIG. 16-19 or 20-23, such as configurations with an electric current that substantially circulates in the direction of the thickness (reference T, FIGS. 1-2) of the heating bodies 3, enable power densities to be reached that are decidedly higher as compared to configurations of the type described with reference to FIGS.

1-6, such as configurations with an electric current that substantially circulates in the direction of the width W of the heating bodies 3.

On the above basis, according to possible embodiments of the invention, it is possible to integrate in a heating device lengths of semifinished product distinguished by different versions of the connection parts 2*a*, for example first lengths with parts 2*a* according to FIGS. 16-19 and second lengths with parts 2*a* according to FIGS. 3-4, i.e., it is possible to integrate different versions of the connection parts 2*a* that are designed to get the electric current to circulate in the direction T and/or in the direction W: in this way, it is possible to differentiate the powers in the various areas of the heating device, for example to have high power values in some specific points, and less high power values in other points.

Once again on the above basis, it is also possible to obtain a semifinished product 1 in which at least two different configurations of connection of the parts 2*a* coexist in order to be able to have sections that guarantee powers that are locally different in their direction of length: for example, between at least two heating bodies 3 connected with parts 2*a* according to FIGS. 16-19 (and hence at higher power) there may be provided at least one heating body 3 connected with parts 2*a* according to FIGS. 3-4 (and hence at a lower power), or else between at least two heating bodies 3 connected with parts 2*a* according to FIGS. 3-4 (and hence at a lower power) there may be provided at least one heating body 3 connected with parts 2*a* according to FIGS. 16-19 (and hence at higher power).

It is also possible to envisage different connection configurations, for example selected from among the ones described herein, for two opposite end regions of one and the same heating body. For instance, one first of the two connection bodies 2 can be associated to the heating bodies 3 with a configuration of the type illustrated in FIGS. 16-19, with the second elements 2" set on a major face of each body 3, while on the respective opposite faces of the bodies 3 a second connection body 2 is provided, for example of the type described with reference to FIGS. 1-6. In such an embodiment, it is also possible for the aforesaid second connection body 2 to have a constant width a little smaller than that of the heating bodies 3. It will hence be appreciated that, the definition of "opposite end regions" may be understood as including also the two major faces of the bodies 3.

As mentioned previously, the mesh structure is preferably formed by the interweaving or criss-crossing of relatively thin elements or parts, for example threads or portions of a netting obtained from machining of a strap. The aforesaid elements or parts preferably have a diameter or other cross-sectional dimension comprised between 0.2 mm and 0.02 mm: this enables an efficient fixing of the mesh structures to the material 3*a* also thanks to their at least partial embedding in the aforesaid material, thus countering any risk of detachment between the parts in question.

For instance, threads that have a diameter smaller than 0.1 mm are advantageous for enabling their forced penetration into the material 3*a*, preferably by heating the latter, as explained previously, and this also in the case of small mesh openings, for example even smaller than 0.05 mm. Threads that have a diameter larger than 0.1 mm may, instead, be more convenient to use when the material 3*a* is overmoulded on the structures 2*a* and it is necessary to have available wider mesh openings to enable penetration of the material itself, for example mesh openings even larger than 1 mm (in general, in conductive woven fabrics that can be used for implementation of the invention, corresponding to threads of larger diameter are wider mesh openings).

The section of a thread of relatively large diameter can be advantageously replaced by the section of a number of small threads. For instance, the section of a thread of 0.14 mm of diameter substantially corresponds to that of three threads of 0.08 mm of diameter: hence, neglecting the skin effect, the passage of electric current that can occur in a thread with a diameter of 0.14 mm can occur in three threads with a diameter of 0.08 mm. If, however, the sum of the circumferences of the three threads with a diameter of 0.08 mm is considered (which is approximately 0.77 mm), it will be noted that it is equal almost to twice the circumference (approximately 0.44 mm) of the single thread having a diameter of 0.14 mm. It will hence be appreciated that to the aforesaid larger "overall" circumference of the three finer threads there corresponds a larger surface of contact (almost twice as large) between the mesh structure and the PTC-effect material, hence with a better electrical contact and a better more extensive overall mechanical adhesion between the mesh structure and the PTC-effect material.

Figure 56:
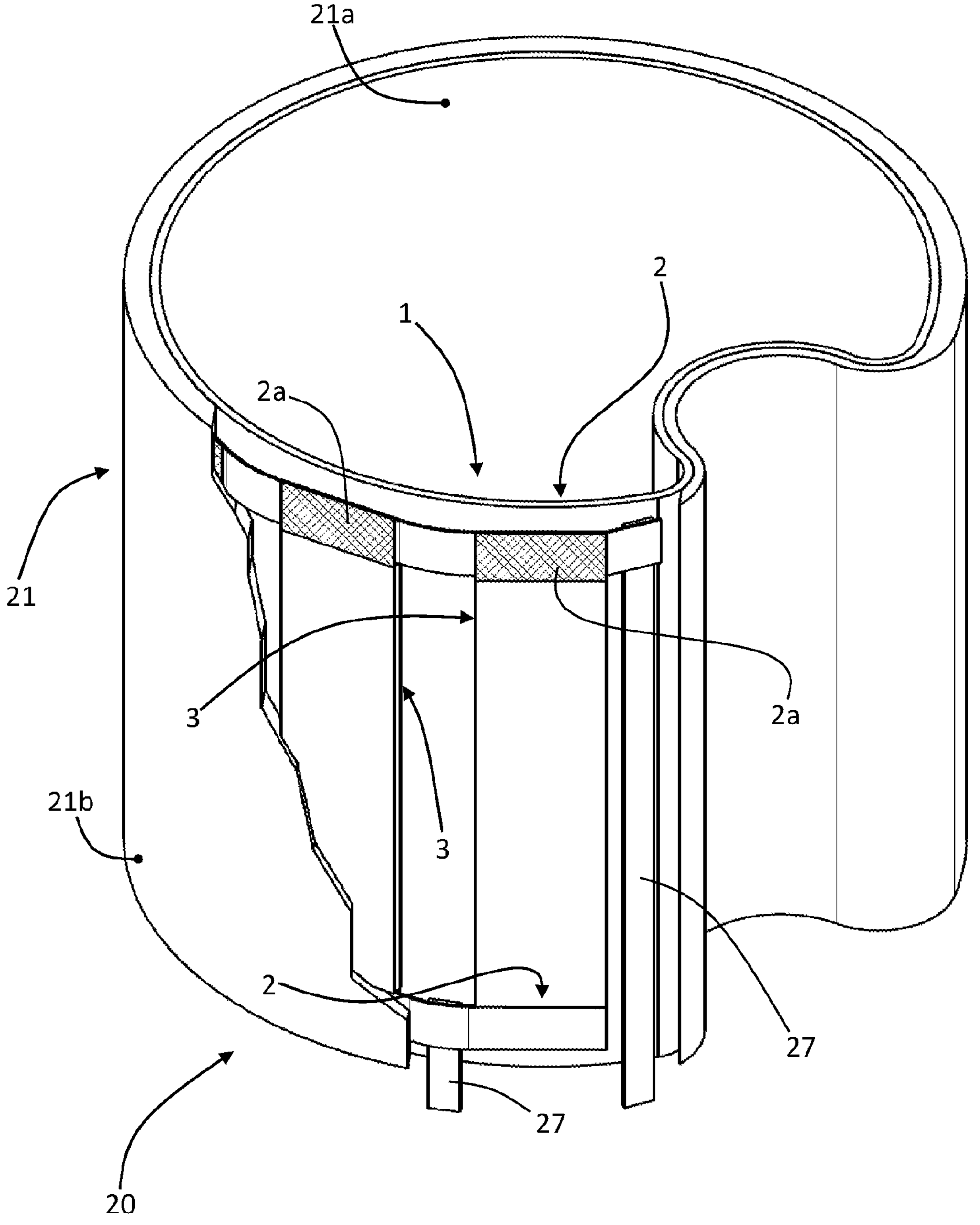
FIG. 56 is a schematic and sectioned perspective view of a heater device according to further possible embodiments of the invention, which integrates at least one length of semifinished product in arched or substantially tubular configuration.

FIG. 56 exemplifies the case of integration of at least one length of semifinished product 1 according to the invention, in a substantially arched configuration, in a heater device 20 of a generally hollow cylindrical shape, which can, for example, be integrated in a different motor-vehicle component, for instance a duct or a tank for a generic liquid substance (for this purpose, the heating bodies 3 could have a shape at least in part curved or arched, in particular in the direction of length L1 indicated previously). As mentioned in the introductory part of the present description, on the other hand, the component that integrates the device 20 could be of some other type, for example a component for housing or mounting a fuel filter of an internal-combustion engine.

In the case exemplified, associated to each of the connection bodies 2 of the length 1—which may for example be of the type described with reference to FIGS. 16-19—is a respective terminal 27, the two terminals 27 projecting from the casing body 21, which here has a substantially tubular shape, for example both from the underside of the body 21. The casing may, for example, be made of electrically insulating thermoplastic material associated to, or overmoulded on, the length 1 and part of the terminals 27, so that only a small part of the terminals 27 projects from the underside of the component, for the purpose of electrical connection. Of course, the device 20 of FIG. 56 could include a number of lengths 1 in arched configuration, preferably but not necessarily substantially the same as one another.

Figure 57:
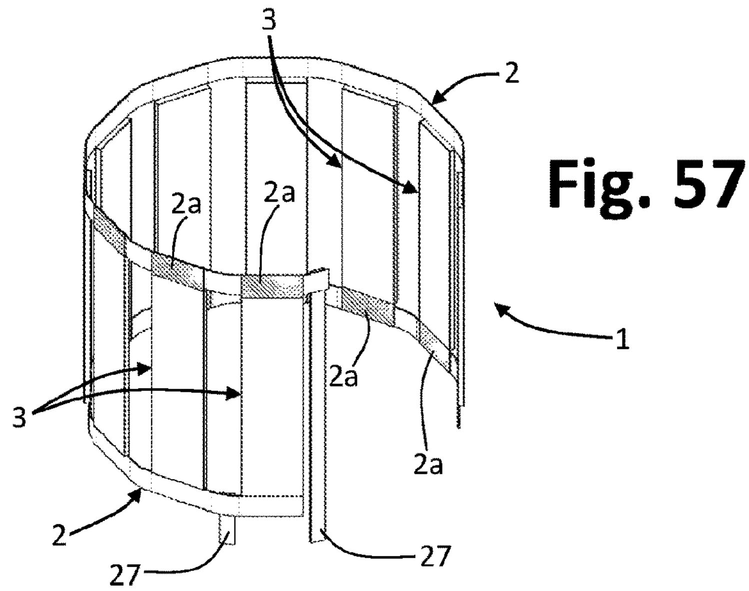
FIGS. 57, 58, and 59 are schematic perspective views aimed at exemplifying a possible sequence of production of a heater device according to FIG. 56.
Figure 58:
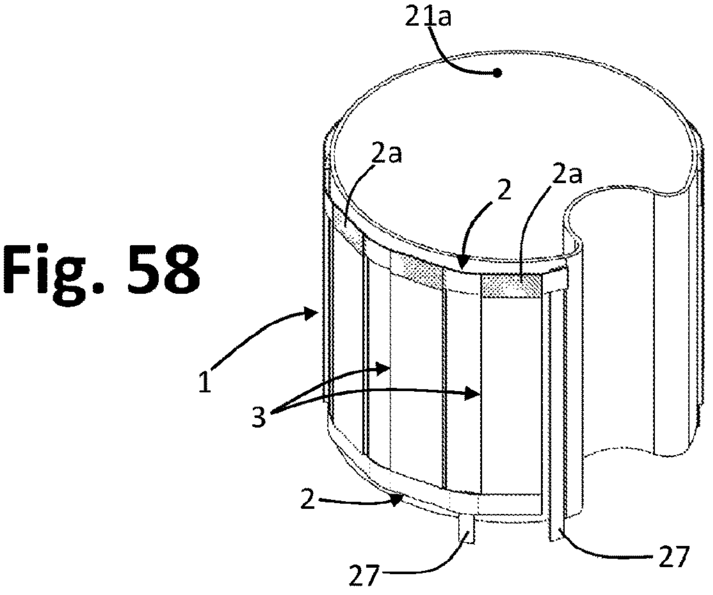

It will be appreciated how, also in this case, construction of the heater, or of the component that integrates it, is very simple: the length 1 is cut to the necessary size, and the terminals 27, for example formed by a metal strap, are then associated to it. The ensemble formed by the length 1 and by the terminals 27 can then be assembled in the corresponding casing or set in a mould, configured according to a technique in itself known for keeping or supporting the length 1 in the arched configuration, and, after closing of the mould, the material necessary for formation of the casing body 21 is injected therein. FIG. 57 exemplifies the case of a length 1, provided with the terminals 27, the connection bodies 2 of which have undergone plastic deformation in order to bestow on the length itself a generally arched shape (of course, the bodies 2 could also be of an elastically flexible type). The length 1 is then mounted on a hollow component made of electrically insulating material that is to provide the inner surface 21*a* of the device 20 as in FIG. 58, and finally overmoulded on the ensemble thus formed is the electrically insulating material that is to provide the outer surface 21*b* of the device 20 as in FIG. 59. The "voids" defined between the different heating bodies 3, i.e., the free spaces of the semifinished product 1 each defined by two bodies 3 and by the corresponding intermediate portions of the bodies 2, may be occupied by the overmoulded material, thereby increasing the overall sturdiness of the device. As has been already mentioned, the parts of the connection bodies 2 which extends between the heating bodies 3 are set at a distance from one another in the width direction, without any mutual overlapping: this is particularly advantageous in order to avoid possible undesired contacts between the two bodies 2, for instance when arc shapes or circular shapes are given to the semifinished product.

Figure 60:
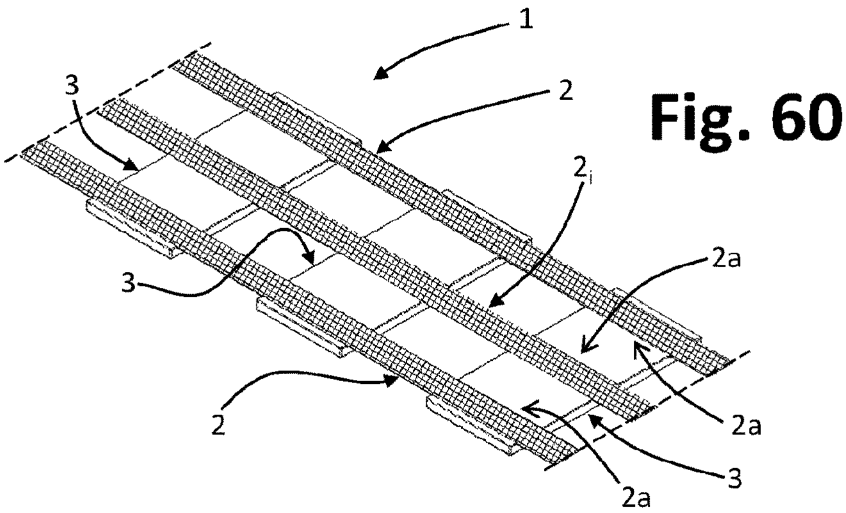
FIG. 60 is a perspective, partial, and schematic view of a further semifinished product of an electric heater device according to possible embodiments of the invention.

In various embodiments, the semifinished product according to the invention can include more than two connection bodies. For instance, exemplified in FIG. 60 is the case of a semifinished product 1 that includes, in addition to the two connection bodies 2 connected in two opposite lateral end regions of each heating body 3, also a further connection body, designated by $\mathbf{2}_i$, also having a width equalling a fraction of the width of the bodies 3. The connection body $\mathbf{2}_i$ extends in an intermediate position between the two connection bodies 2, spaced therefrom in the width direction, and may be made in a similar way, hence comprising respective electrical- and mechanical-connection parts 2*a* with mesh structure, associated to the various bodies 3. In the represented non-limiting example the three connection bodies are associate to one and the same major face of the bodies 3.

Solutions of this type can be adopted to vary emission of heat by the heating bodies 3, it being possible to supply electrically only a part of heating body 3 or the entire heating body 3, i.e., it being possible to supply a length 1 with different supply configurations. For instance, by applying a potential difference between the connection bodies 2, substantially the entire PTC-effect material of the bodies 3 will be supplied for the purposes of heat generation; instead, by applying the potential difference between one of the bodies 2 and the body $\mathbf{2}_i$, only a fraction of the aforesaid material will be electrically supplied, here approximately half of each body 3. According to a different example, by supplying simultaneously with the positive polarity the bodies 2 and with the negative polarity the body $\mathbf{2}_1$ (or vice versa) it would substantially be possible to double the power of the body 3, in so far as in this way the resistance of the circuit is substantially halved.

The various bodies 2 and $\mathbf{2}_i$ are not necessarily all associated to one and the same face of the corresponding heating body: for example, it is possible to associate the two bodies 2 to one face and the body $\mathbf{2}_i$ to the opposite face, it being understood that their width will be preferably equal to a fraction of the width of the bodies 3 (here a width which is lower to one third of the width of the bodies 3) in the intermediate stretches comprised between two bodies 3.

Figure 61:
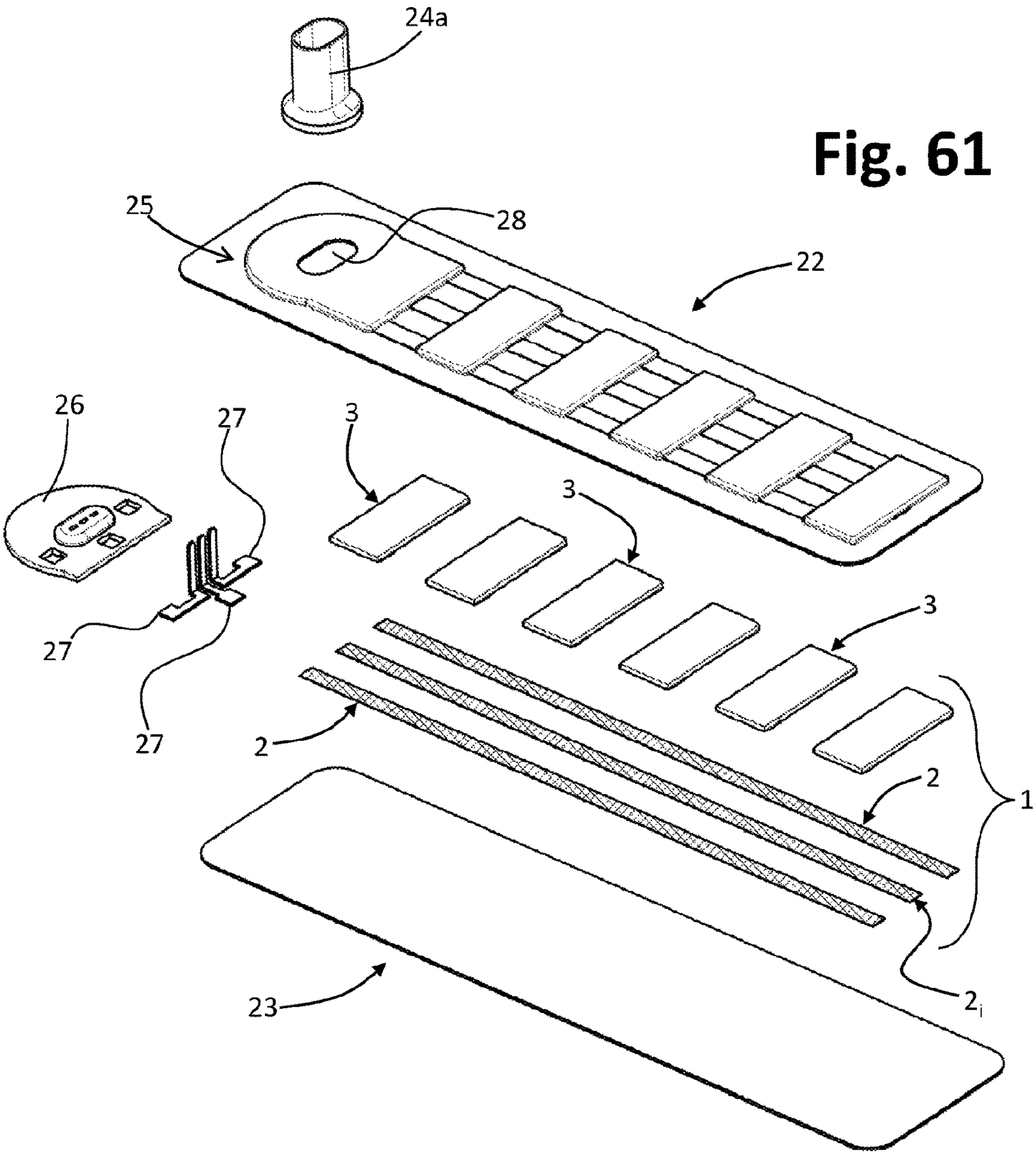
FIG. 61 is a schematic exploded view of a heater device according to further possible embodiments of the invention, which integrates a length of semifinished product of the type illustrated in FIG. 60.

FIG. 61 is a schematic exploded view of a heater device that integrates a length of the semifinished product of FIG. 60. The type of embodiment is substantially similar to the one exemplified with reference to FIGS. 27 to 30. In this case, it is, however, preferable for at least one of the two casing parts 22, 23 to be shaped so as to enable positioning also of the intermediate connection body $\mathbf{2}_i$. In the example, the casing part 22 is shaped so as to define a corresponding housing or seat 25 having a profile at least in part complementary to that of the length 1 and hence defining also a respective part of housing that is to receive the connection body $\mathbf{2}_i$ at least partially.

Moreover, in the case exemplified the heater device includes three electrical terminals 27, each set in electrical contact with a respective connection body 2 and $\mathbf{2}_i$ of the length 1. Also in this case the positioning element 26 for the terminals 27, and the terminals themselves, are shaped so as to project in a direction transverse or orthogonal to a plane identified by the length 1, through an opening 28 defined in the casing part 22, where a connector body 24*a*, configured for receiving inside it part of the three terminals 27 and thereby providing an electrical connector, is mounted.

Figure 62:
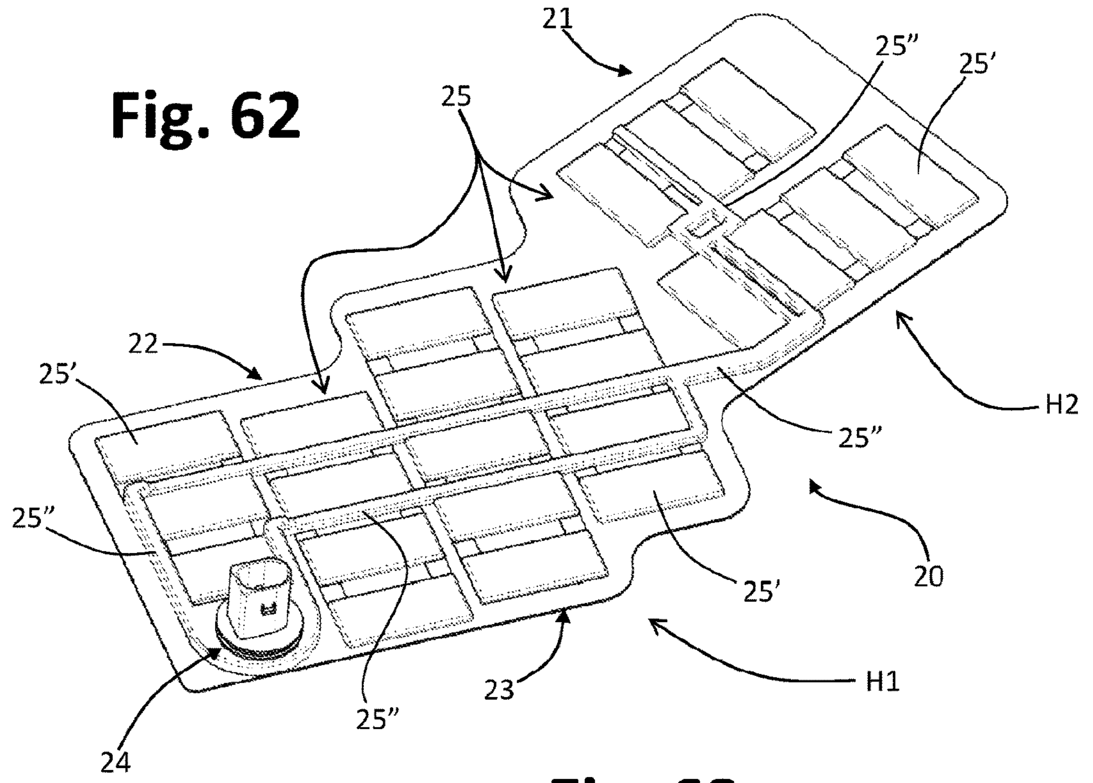
FIG. 62 is a schematic perspective view of an electric heater device, which integrates a plurality of lengths of semifinished product according to possible embodiments of the invention.
Figure 63:
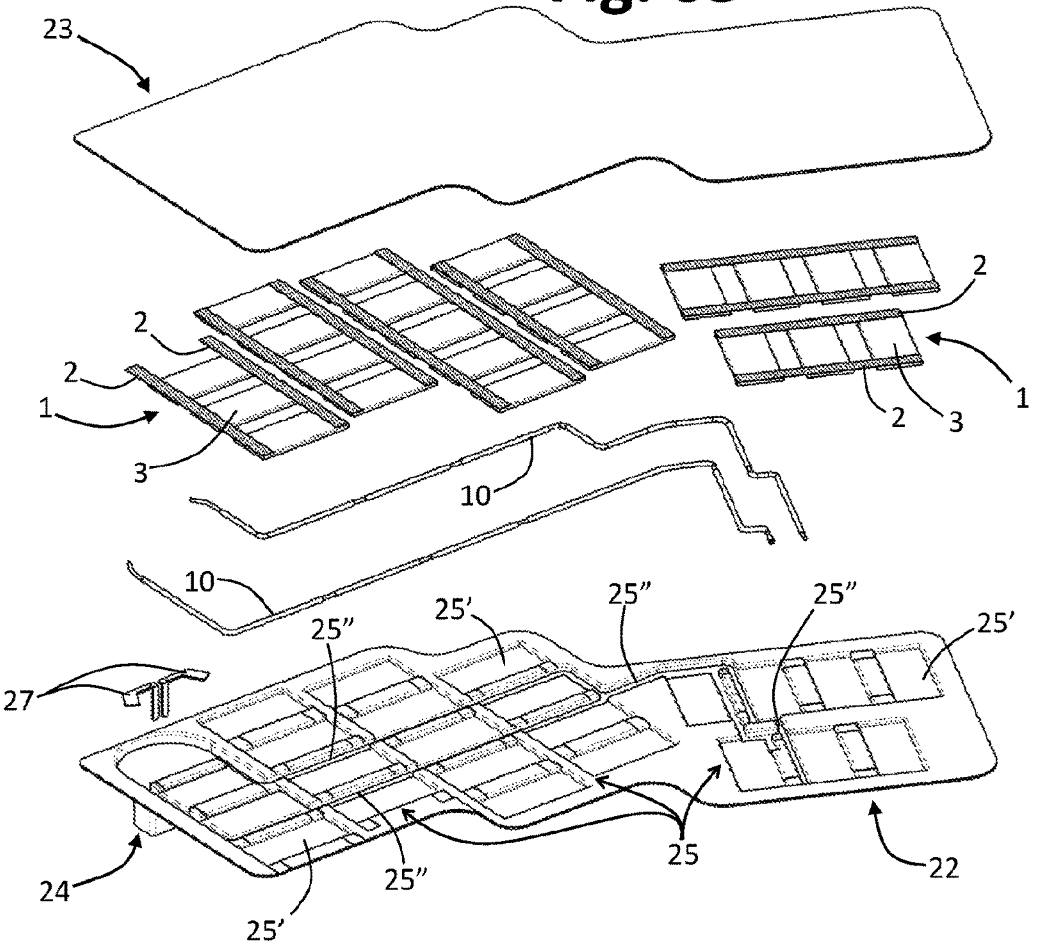
FIG. 63 is a schematic exploded view of a heater device of the type illustrated in FIG. 62.
Figure 64:
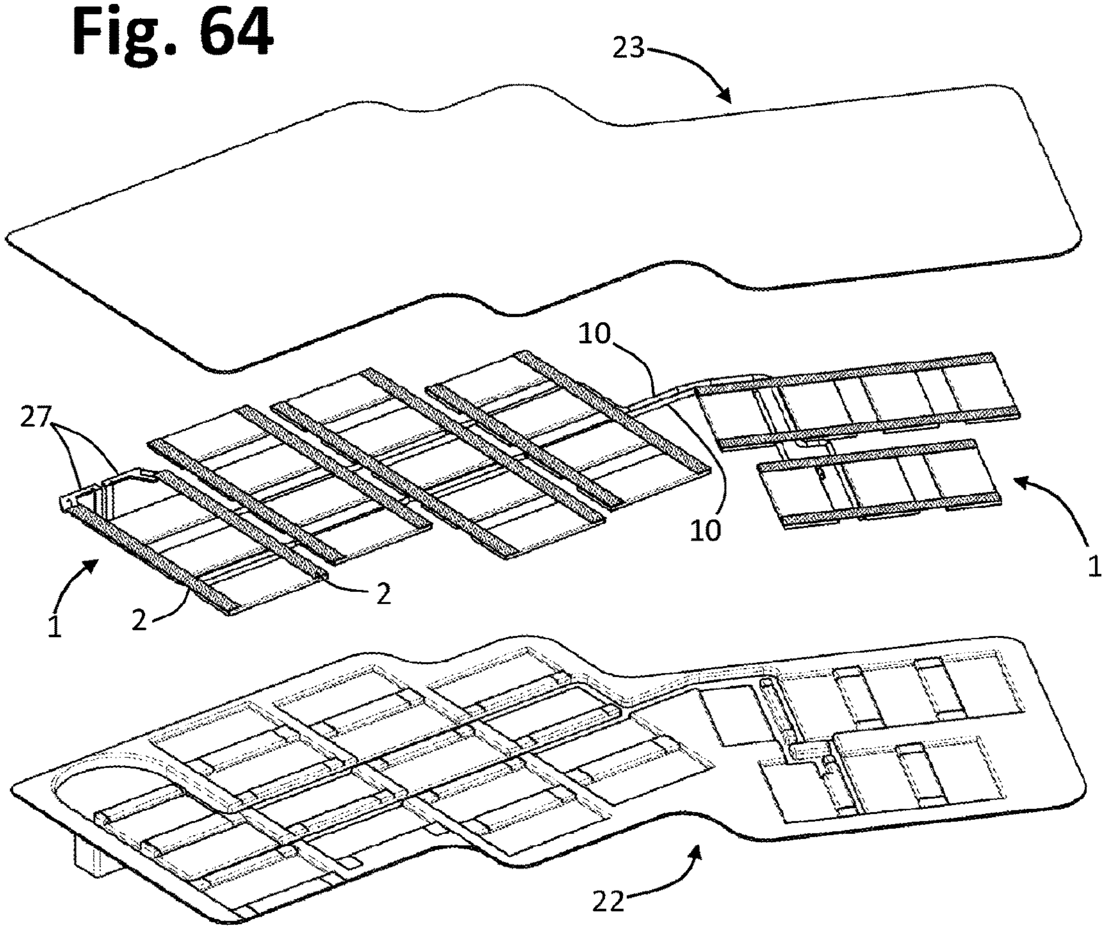
FIG. 64 is a partially exploded schematic view of a heater device of the type illustrated in FIG. 62.

FIGS. 62-64 are schematic representations of a further possible embodiment of a heater device according to the invention, which includes a plurality of lengths of semifinished product according to the invention. These figures exemplify how, in various embodiments, not all the lengths of semifinished product 1 integrated in a heating device necessarily have to be arranged parallel to one another. The same figures likewise exemplify how, in various embodiments, at least one part of the casing body can be shaped in order to define positioning areas for electrical conductors that connect together a number of lengths of semifinished product.

Figure 46:
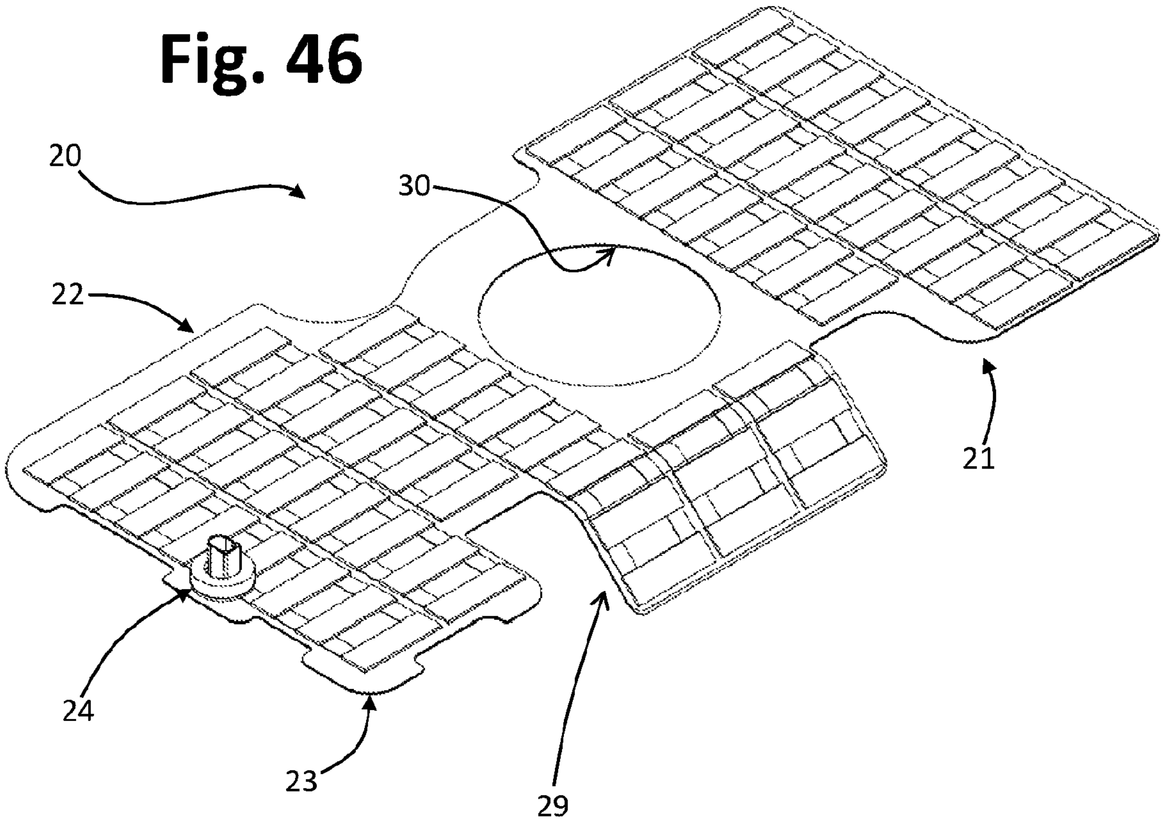
FIGS. 46 and 47 are schematic perspective views, from different angles, of an electric heater device according to further possible embodiments of the invention.
Figure 47:
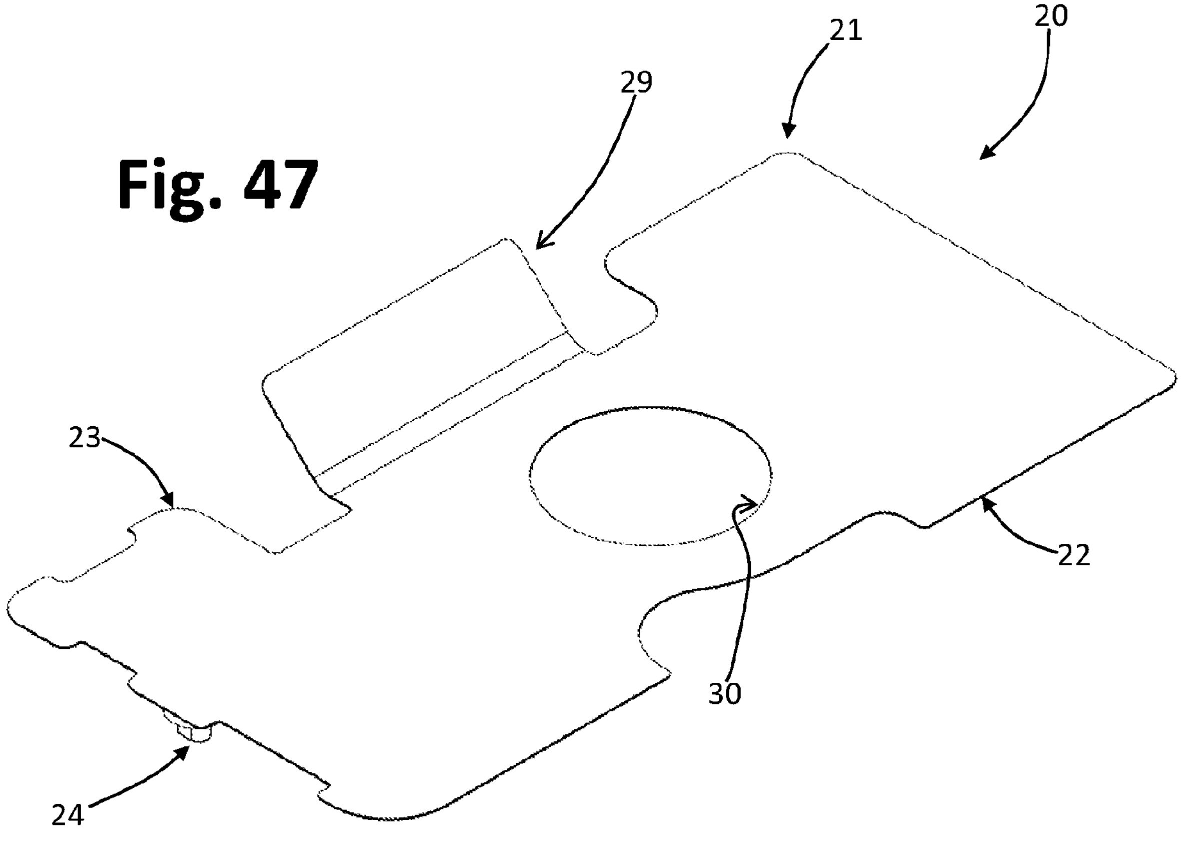

The device 20 of FIG. 62 is substantially similar to the one described with reference to FIGS. 46-49, even though it does not include inclined portions and through openings of the types designated by 29 and 30 in FIGS. 46-47 (at least one said inclined portion 29 and at least one said through opening could, however, be provided also in the device of FIGS. 62-64).

Also in this case, at least one of the two casing parts 22, 23 defines a housing or seat 25, configured for receiving at least partially a plurality of respective sections or lengths. With reference in particular to FIGS. 62 and 63, it may be noted how the housing defined in the casing body 21, and here in particular in its part 22, presents both housing areas 25' for the various lengths of semifinished product 1 and housing areas 25" for the electrical cables or conductors 10 used for electrically connecting together the various lengths, in particular according to a transverse direction of the aforesaid sections or lengths. It should be noted that housing areas of the type designated by 25" may, where so required, be provided also in the device of FIGS. 46-49.

In the case exemplified, the opposite ends of the aforesaid conductors 10 are each connected to a respective connection body of the two lengths designated by 1 in FIG. 63 (i.e., basically, the length that is closer to and the length that is further away from the connector 24). The same conductors 10 are then each connected, in intermediate points, to a respective connection body of each of the other lengths provided, for example according to the modalities described previously with reference to FIGS. 9-15. The configuration of connection between the various lengths may be seen in FIG. 64. From FIG. 64 it may be noted how, in various embodiments, the electrical terminals 27 for electrical connection of a heater device according to the invention can be connected directly to the connection bodies 2 of one section or length (in the specific case represented, the length closest to the connector 24).

FIGS. 62-64 likewise illustrate how, in a heating device, a number of lengths not necessarily have to be arranged parallel to one another, it being possible, instead, for them to be arranged angled with respect to one another. From the above figures it may be noted in fact how, in the device 20 illustrated, two different heating areas are basically provided, designated by H1 and H2 in FIG. 62, the area H1 including four lengths of semifinished product 1, and the area H2 including two lengths of semifinished product 1, the lengths being parallel to one another in each area H1, H2. It may be noted, however, how the lengths of the areas H1 and H2 are arranged at different angles, for example for particular needs of mounting of the device 20 or particular needs of distribution of the heat emitted by the device during its operation.

As mentioned previously, the fact that the semifinished product according to the invention can have a substantially flexible or semi-rigid structure enables it to be wound on itself so as to assume a more or less cylindrical shape, in particular to form a roll or a reel, this being particularly advantageous for the purpose of handling in the production and storage stage. This possibility, as has been seen, is allowed by the areas of articulation provided by the stretches of the connection bodies having reduced width that are located in an intermediate position between the heating bodies.

As already mentioned, the aforementioned structure can also be folded on itself in opposite directions or according to a zigzag pattern, preferably with portions substantially of the same length, to form a sort of more or less parallelepipedal stack of the desired height, which is likewise advantageous for the purpose of handling and storage.

The rolled-up or folded form of the semifinished product, possibly with the aid of a support or container, makes it possible to obtain a feeder designed to be mounted on a machine or an automatic production line, for example for feeding and cutting into lengths the semifinished product in the size required, and implementing other production steps, such as welding of wires or electrical terminals and/or mounting on a support or casing of a heater device.

Figure 65:
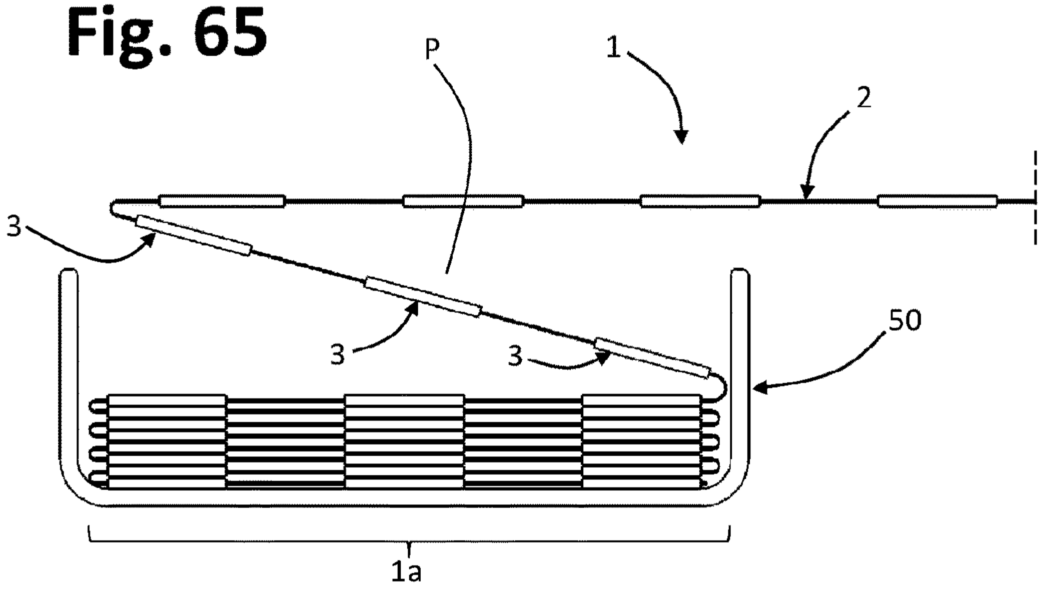
FIG. 65 is a schematic lateral view of a system, according to possible embodiments of the invention, for storage of a semifinished product and from which lengths of the product can be taken.

FIG. 65 exemplifies the case of a semifinished product 1 in the configuration where it is folded on itself in substantially equal portions, each including a certain number of heating bodies 3 and the corresponding stretches of the connection bodies 2. In the example illustrated, each folded portion, one of which is designated by P, includes three bodies 3 and respective stretches of the bodies 2. As may be appreciated, the stretches of the bodies 2 that are located between two portions P (here substantially bent at 180°) provide the aforementioned articulation areas, which enable bending in a zigzag pattern of the semifinished product 1 as a whole. In this way, the various portions P are substantially stacked, and in any case connected together by the aforesaid articulation areas.

In FIG. 65, designated by 50 is a container in which the folded semifinished product 1 can be housed and from which the various portions P can be wound off according to the need. Such a container 50 (as well as a spool, in the case where it is wound in a roll) can function as or form part of a feeder, i.e., of a device that can be used for supplying the semifinished product to a machine or a production line; for this purpose, the spool or container 50 preferably has a purposely provided attachment for fixing to a machine or production line.

Figure 59:
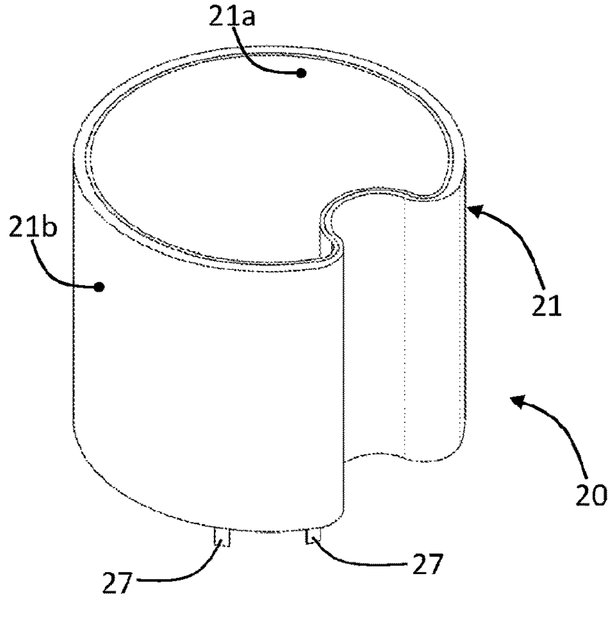

It will be clear to the person skilled in the art that the concepts expressed in relation to the embodiments described with reference to FIGS. 1-59 may be applied also in the case of the embodiments described with reference to FIGS. 60-65.

From the foregoing description, the characteristics of the present invention emerge clearly, as likewise do its advantages. The semifinished product according to the invention, which is simple and economically advantageous to produce, can be obtained in the form of a strip or web that can be produced and advantageously stored in compact form, for example in the form of roll or folded on itself, and then be subsequently cut to the desired length in order to be assembled in various possible forms inside a corresponding protective and supporting casing. The fact that the connection bodies include mesh structures at least partially embedded in the PTC-effect material of the heating bodies ensures a reliable electrical and mechanical connection, at the same time countering any risk of separation or detachment between the parts in question, in particular when the semifinished product is rolled up or folded or has to be bent during the production step, for the purposes of production of a heater device or of its integration or mounting in a different component. The fact that the mesh structure used for the electrical and mechanical connection of the various heating bodies is preferentially relatively extensive and dense ensures a good surface of adhesion and contact between the connection bodies and the PCT-effect material, with an optimal distribution and intensity of electric current. The fact that the heating bodies are relatively stiff and the intermediate portions of the connection bodies have a reduced width and are relatively flexible or deformable, possibly in a plastic way, means that it is possible to have available a structure that can be easily adapted or integrated for different uses or products. As has been seen, the structure in question can in any case be easily rolled up or folded, with evident advantages in terms of reduction of encumbrance and ease of handling of the semifinished product.

The lengths of the semifinished product according to the invention can be easily "modelled" in different shapes in order to allow distribution of the heat in an optimal way according to the shapes of the heating devices or components that are to integrate the aforesaid lengths, it being possible for these devices and components to have geometries that are even very different from one another. This also avoids having to provide dedicated moulds for the PTC-effect material according to the geometry of the application; the moulds for producing the heating bodies according to the invention are on the other hand very simple. Also the casings of devices that integrate lengths of semifinished product according to the invention are convenient to produce and can be used for a wide range of shapes of heater device, for example using thermoforming techniques or, as has been seen, exploiting for modelling the same equipment used in the step of welding between two casing parts.

The portions of the connection bodies that extend in intermediate positions between two heating bodies can function not only as areas of articulation or deformation but also as areas of compensation for recovery of possible dimensional variations, in particular the dimensional variations due to thermal variations (such as expansions or contractions during the operating cycles of heating and subsequent cooling), thus reducing the risks of faults in the semifinished product and/or in the device or component that integrates it. Provided that the aforesaid portions are set at a distance in the width direction, any risks is avoided of accidental electrical contact between the connection bodies, when non-rectilinear shapes are given to the semifinished product, such as arc shapes or circular shapes.

It is clear that numerous variations may be made by the person skilled in the branch to the semifinished product and the electric heater device described by way of example, without thereby departing from the scope of the invention as defined in the ensuing claims.

Without prejudice to the other advantages, the semifinished product according to the invention may be produced also as plane strip or web (i.e., not rolled up or folded), having a length in any case suitable for convenient storage, for example between 1 and 4 m, which can subsequently be cut to the desired length.

The invention claimed is:

1. A semi-finished product of an electric heater device, having a structure that extends in a length direction and a width direction, the structure comprising:

at least two connection bodies, which extend alongside or parallel to one another in the length direction and are at least in part flexible or deformable in the length direction; and a plurality of heating bodies, each heating body including a material having a PTC effect, wherein the heating bodies are set at a distance from one another in the length direction and extend generally in a direction transverse to the length direction, wherein the material having a PTC effect is a polymer-based material that is in electrical contact with the at least two connection bodies, the at least two connection bodies having respective parts that are intermediate to two heating bodies which are successive in the length direction, wherein each of the at least two connection bodies comprises electrical and mechanical connection parts that have a mesh structure that is at least partially embedded or englobed in the polymer-based material, wherein the intermediate parts of the at least two connection bodies have a width equaling a fraction of a width of the heating bodies in the width direction, and wherein each intermediate part of one of the at least two connection bodies extends at a distance, in the width direction, from each intermediate part of another one of the at least two connection bodies.

2. The semi-finished product according to claim 1, wherein the mesh structure of the electrical and mechanical connection parts is formed by the interweaving or by the criss-crossing of filiform elements of electrically conductive material, or is formed by a single element of electrically conductive material with a meshed shape.

3. The semi-finished product according to claim 1, wherein each heating body has two opposite major faces, and the mesh structure of each electrical and mechanical connection part extends parallel to at least one of the two opposite major faces of the corresponding heating body.

4. The semi-finished product according to claim 3, wherein the mesh structure of each electrical and mechanical connection part of the at least two connection bodies is associated to one and the same major face of the heating bodies, at respective end regions, spaced from one another.

5. The semi-finished product according to claim 3, wherein the mesh structure of each electrical and mechanical connection part of a first one of said at least two connection bodies is associated to a major face of the heating bodies, and the mesh structure of each electrical and mechanical connection part of a second one of said at least two connection bodies is associated to the other major face of the heating bodies.

6. The semi-finished product according to claim 1, wherein:

the mesh structure of each electrical and mechanical connection part is at least partially force-fitted into the corresponding heating body at a face thereof; or each heating body is a body overmoulded at least in part on the mesh structures of the corresponding electrical and mechanical connection parts of the at least two connection bodies.

7. The semi-finished product according to claim 1, wherein each of the at least two connection bodies is made up of a number of parts, which comprise a first element that extends in the length direction and a plurality of second elements that extend transversely with respect to the first element, in the width direction, wherein the first element has a width corresponding to a fraction of the width of the heating bodies in the width direction, and the second elements each comprises a respective mesh structure having a first portion that is at least partially embedded or englobed in the polymer-based material of a corresponding heating body, and a second portion that is superimposed, or connected at least in part to, the first element, in electrical and mechanical contact therewith.

8. The semi-finished product according to claim 7, wherein the first element has a width which is a fraction of a width of the heating bodies.

9. The semi-finished product according to claim 1, wherein each of the at least two connection bodies is entirely formed by a single piece or element having a mesh structure.

10. The semi-finished product according to claim 9, wherein the single piece or element defines a first portion that extends in the length direction and has a width equaling a fraction of a width of the heating bodies in the width direction, and a plurality of second portions that extend transversely from the first portion, in the width direction, the second portions having a part that is at least partially embedded or englobed in the polymer-based material of a corresponding heating body.

11. The semi-finished product according to claim 1, wherein said structure has, in the length direction, an alternation of first, stiffer, portions, in positions corresponding to the heating bodies, and second, less stiff, portions, corresponding to said parts of the at least two connection bodies that are intermediate between two successive heating bodies, the second portions providing areas of articulation, or deformation, or compensation of the structure.

12. An electric heater device, comprising at least one heating element having a structure that extends in a length direction and a width direction, wherein the at least one heating element comprises a piece of at least one semi-finished product according to claim 1.

13. The electric heater device according to claim 12, further comprising a plurality of electrical conductors for electrically connecting the heating elements together, the electrical conductors extending at least partially in a direction transverse with respect to the length direction of a corresponding piece of semi-finished product.

14. The semi-finished product according to claim 1, wherein said intermediate parts of the at least two connection bodies have a width which is a fraction of a width of the heating bodies, and wherein each intermediate part of one of said at least two connection bodies extends at a distance from a corresponding one of said intermediate parts which belongs to another one of said at least two connection bodies, in the width direction.

15. The semi-finished product according to claim 1, wherein the polymer-based material is in electrical contact with the at least two connection bodies at two end regions of the corresponding heating body which are opposite to one another in the width direction.

16. The semi-finished product according to claim 1, wherein the mesh structure is at least partially embedded or englobed in the polymer-based material, in at least one respective end region of the corresponding heating body.

17. The semi-finished product according to claim 1, wherein:

the mesh structure of each electrical and mechanical connection part of the at least two connection bodies is associated to one and the same major face of the heating bodies, at corresponding opposite end regions thereof in the width direction, spaced from one another, or the mesh structure of each electrical and mechanical connection part of one of the at least two connection body is associated to a major face of the heating bodies, and the mesh structure of each electrical and mechanical connection part of another one of the at least two connection body is associated to the opposite major face of the heating bodies.

* * * * *